(12) United States Patent
Mack

(10) Patent No.: US 10,545,937 B2
(45) Date of Patent: *Jan. 28, 2020

(54) METHOD AND APPARATUS FOR CONVERTING HETEROGENEOUS DATABASES INTO STANDARDIZED HOMOGENEOUS DATABASES

(71) Applicant: Robert Mack, Hillsborough, NJ (US)

(72) Inventor: Robert Mack, Hillsborough, NJ (US)

(*) Notice: Subject to any disclaimer, the term of this patent is extended or adjusted under 35 U.S.C. 154(b) by 71 days.

This patent is subject to a terminal disclaimer.

(21) Appl. No.: 15/360,629

(22) Filed: Nov. 23, 2016

(65) Prior Publication Data

US 2017/0124131 A1 May 4, 2017

Related U.S. Application Data

(63) Continuation of application No. 14/022,514, filed on Sep. 10, 2013, now Pat. No. 9,552,380, which is a continuation of application No. 13/152,683, filed on Jun. 3, 2011, now Pat. No. 8,554,801, and a continuation-in-part of application No. 12/500,957, filed on Jul. 10, 2009, now Pat. No. 7,979,475.

(51) Int. Cl.
*G06F 16/22* (2019.01)
*G06F 16/21* (2019.01)
*G06F 16/25* (2019.01)
*G06F 16/2455* (2019.01)

(52) U.S. Cl.
CPC ........ *G06F 16/2228* (2019.01); *G06F 16/211* (2019.01); *G06F 16/24556* (2019.01); *G06F 16/258* (2019.01)

(58) Field of Classification Search
CPC ......... G06F 17/30321; G06F 17/30292; G06F 17/30489; G06F 16/2228; G06F 16/24556; G06F 16/211; G06F 16/258
See application file for complete search history.

(56) References Cited

U.S. PATENT DOCUMENTS

| | | | |
|---|---|---|---|
| 5,560,005 | A | 9/1996 | Hoover |
| 5,907,846 | A | 5/1999 | Berner et al. |
| 6,366,917 | B1* | 4/2002 | St. John Herbert, III .................. G06F 17/30595 |
| 6,442,557 | B1 | 8/2002 | Buteau et al. |
| 6,847,979 | B2 | 1/2005 | Allemang et al. |
| 7,024,417 | B1 | 4/2006 | Russakovsky et al. |
| 7,461,077 | B1* | 12/2008 | Greenwood .......... G06F 3/0482 |
| 7,469,248 | B2 | 12/2008 | Agrawal |

(Continued)

OTHER PUBLICATIONS

"Rules of Data Normalization", DataModel.Org, www.datamodel.org/NormalizationRules.html; Mar. 4, 2009; five pages.

(Continued)

*Primary Examiner* — Mark D Featherstone
*Assistant Examiner* — Faezeh Forouharnejad
(74) *Attorney, Agent, or Firm* — Walter J. Tencza, Jr.

(57) ABSTRACT

A method, an apparatus, and a system for configuring, designing, and/or implementing database tables are detailed that provides a framework into which a remainder of database tables is developed. Also detailed is a method to develop this framework of database tables. This so developed framework provides a platform for converting multiple independent heterogeneous databases into standardized homogeneous databases.

24 Claims, 25 Drawing Sheets

(56) References Cited

U.S. PATENT DOCUMENTS

| | | | |
|---|---|---|---|
| 7,558,793 B1* | 7/2009 | Topolovac | G06Q 10/087 |
| 2002/0022987 A1 | 2/2002 | Mahmood et al. | |
| 2003/0018616 A1 | 1/2003 | Wilbanks et al. | |
| 2004/0064456 A1 | 4/2004 | Fong | |
| 2004/0093344 A1 | 5/2004 | Berger et al. | |
| 2005/0004902 A1 | 1/2005 | Torigoe et al. | |
| 2005/0216503 A1 | 9/2005 | Chariot et al. | |
| 2005/0240621 A1 | 10/2005 | Robertson et al. | |
| 2005/0278308 A1 | 12/2005 | Barstow | |
| 2006/0123010 A1* | 6/2006 | Landry | G06F 16/25 |
| 2006/0195460 A1 | 8/2006 | Nori et al. | |
| 2007/0255730 A1* | 11/2007 | Mack | G06F 8/10 |
| 2008/0162415 A1* | 7/2008 | Kaiser | G06F 16/252 |
| 2008/0281801 A1* | 11/2008 | Larson | G06F 16/748 |
| 2009/0292745 A1* | 11/2009 | Bose | G06F 16/27 |
| 2010/0241637 A1 | 9/2010 | Kissner | |

OTHER PUBLICATIONS

Edward J. Quigley and Anthony Debons, "Interrogative Theory of Information and Knowledge", pp. 4-10.

* cited by examiner

Fig. 3

(Prior Art)

*Country* (308, 310, 312, 302, 314)

| Country Abbreviation | Country Name |
|---|---|
| USA | United States of America |
| CAN | Canada |
|  |  |
|  |  |
|  |  |
|  |  |

316

306

*State* (318, 320, 322, 324, 304)

| Country Abbreviation | State Abbreviation | State Name |
|---|---|---|
| USA | AL | Alabama |
| USA | AK | Alaska |
| USA | AR | Arkansas |
| USA | AZ | Arizona |
| USA | CA | California |
| USA | CO | Colorado |

(Prior Art)

| Country Abbreviation | Country Name | State Abbreviation | State Name |
|---|---|---|---|
| USA | United States of America | AL | Alabama |
| USA | United States of America | AK | Alaska |
| USA | United States of America | AR | Arkansas |
| USA | United States of America | AZ | Arizona |
| USA | United States of America | CA | California |
| USA | United States of America | CO | Colorado |

Fig. 17A

Transaction 1702

| Transaction ID | Transaction Date | Account Number | Transaction Type Code | Check Number | Transaction Description | Amount |
|---|---|---|---|---|---|---|
| 1 | 3-Jan-2000 | 9999 99999 | DEP | | Initial Deposit | $50,000.00 |
| 2 | 4-Jan-2000 | 9999 44844 | DEP | | Pay check | $3,000.00 |
| 3 | 4-Jan-2000 | 9999 99999 | CK | 1000 | Bought Car | -$35,000.00 |
| 4 | 4-Jan-2000 | 9999 99999 | CK | 1001 | Mortage | -$2,500.00 |
| 5 | 5-Jan-2000 | 9999 99999 | EFT | | Pay check | $2,000.00 |
| 6 | 6-Jan-2000 | 9999 44844 | CK | 2345 | Car Insurance | -$1,950.00 |
| 7 | 6-Jan-2000 | 9999 44844 | CK | 2346 | Trash Collection | -$150.00 |
| 8 | 6-Jan-2000 | 9999 44844 | CK | 2347 | Electric Bill | -$500.00 |

METHOD AND APPARATUS FOR CONVERTING HETEROGENEOUS DATABASES INTO STANDARDIZED HOMOGENEOUS DATABASES

CROSS REFERENCE TO RELATED APPLICATION(S)

The present application is a continuation of and claims the priority of U.S. patent application Ser. No. 14/022,514, filed on Sep. 10, 2013, inventor and applicant Robert Mack, which is a continuation of U.S. patent application Ser. No. 13/152,683, filed on Jun. 3, 2011, inventor and applicant Robert Mack, issued as U.S. Pat. No. 8,554,801, which is a continuation in part of and claims the priority of U.S. patent application Ser. No. 12/500,957, filed on Jul. 10, 2009, inventor and applicant Robert Mack, issued as U.S. Pat. No. 7,979,475, such that Jul. 10, 2009 is the earliest priority date for the present application.

FIELD OF THE INVENTION

This invention relates to improved methods and apparatus concerning the design and development of data models and the deployment of database tables and other associated database objects.

BACKGROUND OF THE INVENTION

Database development is a relatively new technology dating back to around the 1960's. In 1976, the concept of entity-relationship diagramming and data modeling was developed. One function of data models is to design the structures of databases such as database tables and database columns. By the late 1980's, specialized databases, referred to as data warehouses, where being designed for the purpose of optimizing report generation. The data warehouse database uses data redundancy and data aggregation to improve data retrieval speed.

Alternative data model development methods have since been developed that are variations of the entity-relationship diagrams. These alternative data model development methods are also computer based software applications that include the Unified Modeling Language method and the Object-Oriented Data Modeling method. Also, some vendors supply skeletal data models stored in computer memory that are incomplete data models usually specific to certain industries. The purchased skeletal data models are then completed in computer memory where more specific data requirements are implemented.

SUMMARY OF THE INVENTION

One or more embodiments of the present invention include a method of placing data into an individual column of a database table in a computer memory and grouping the data into a single database record, in a computer memory. A computer processor may be programmed by computer software stored in computer memory, to place data into an individual column, automatically or in response to a computer user's inputs through a computer interactive device, such as computer keyboard or computer mouse.

The method may further include the addition of more columns into a database table, in a computer memory, for the purposes of integrating data records in multiple database tables, in a computer memory, as implemented for example by a computer processor programmed by computer software, stored in computer memory. In addition, a method in accordance with an embodiment of the present invention may include the creation, in a computer memory, of database access paths to aid in the combination of data records stored in multiple said database tables in a computer memory, as implemented for example by a computer processor programmed by computer software, stored in computer memory. A further method in accordance with an embodiment of the present invention may include the formation of one or more database bridges, in computer memory, that provide database access paths between two or more databases, as implemented for example by a computer processor programmed by computer software, stored in computer memory.

The concern for the data set integration method of one or more embodiments of the present invention is in developing reusable foundation database structures. One or more embodiments of the present invention develops standard foundation database tables in a computer memory that may be incorporated into many databases in computer memory thus providing a data sharing functionality to these so developed databases. In addition, reusable standard computer-based methods for populating data records for each standard foundation database table are created and utilized. These standard methods are used, in at least one embodiment by a computer processor programmed by computer software in accordance with embodiments of the present invention to create data records for these standard foundation database tables in multiple databases where the data records are stored in computer memory.

A database integration method in accordance with an embodiment of the present invention, in one or more computer memories, becomes important as it provides additional functionality in the definition of all database tables, in one or more computer memories. That is, with a database integration method of one or more embodiments of the present invention, independently designed databases are converted, for example by a computer processor programmed by computer software stored in computer memory, into standardized databases in one or more computer memories. The resulting database data records are more universally identified since all database tables are considered instead of developing database tables as totally independent data structures.

BRIEF DESCRIPTION OF THE DRAWINGS

FIG. 3 depicts a prior art pair of database tables linked by a foreign key constraint that was instantiated from the entity-relationship diagram shown in FIG. 2 and populated with data values that can be displayed on a display device of the apparatus of FIG. 1 or stored in a computer memory of the apparatus of FIG. 1;

FIG. 4 depicts a prior art spreadsheet of data retrieved from the populated database shown in FIG. 3;

FIG. 17A depicts a prior art populated database table;

DETAILED DESCRIPTION OF THE DRAWINGS

Figure 1:
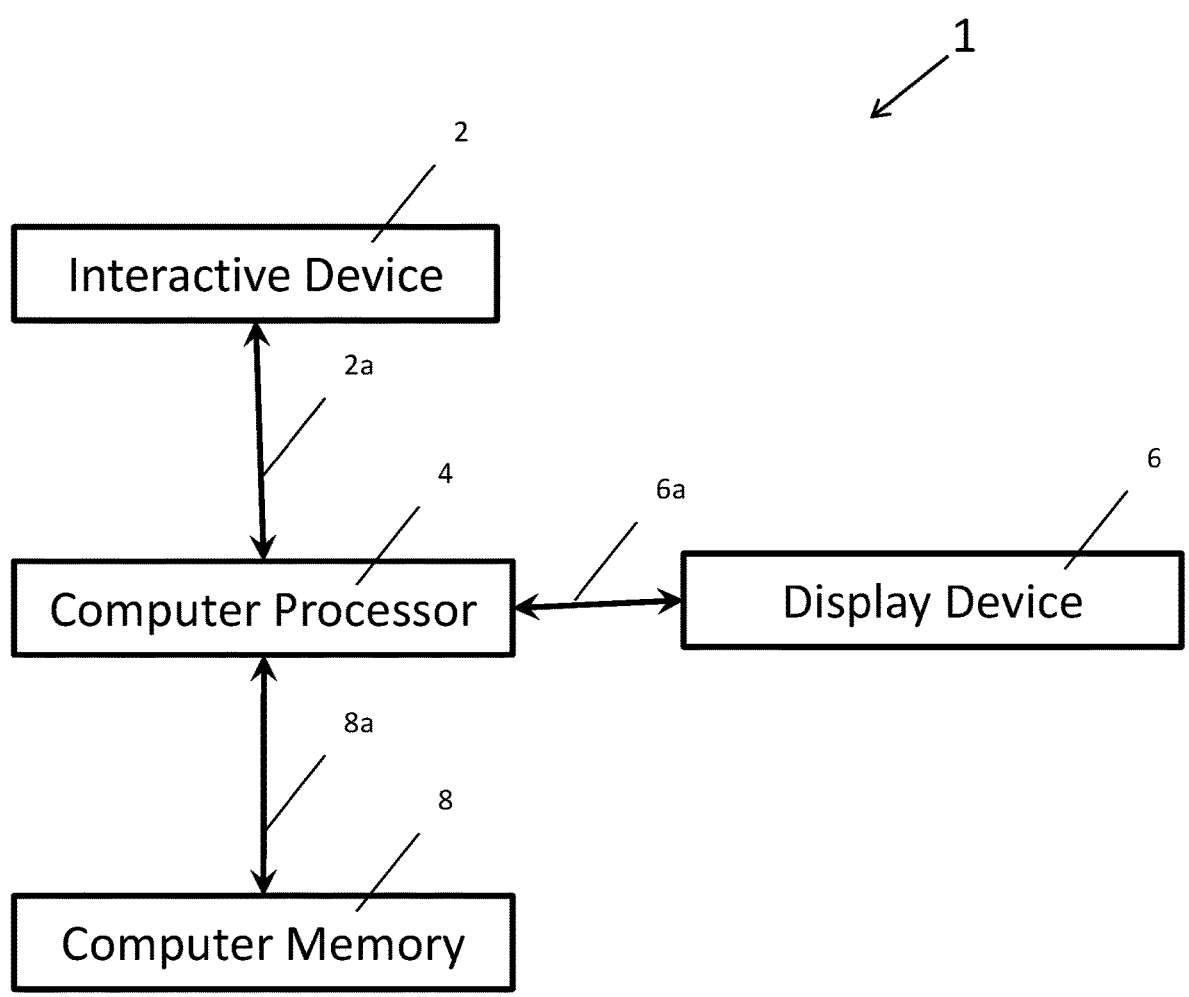
FIG. 1 shows a diagram of an apparatus in accordance with an embodiment of the present invention.

In the present application the following terms have the following definitions:

Alternate key—In an entity-relationship diagram, a data entity's alternate key is a unique key, stored in one or more computer memories, such as computer memory 8 in FIG. 1 that is declared in the entity-relationship diagram as an alternate method of selecting unique data records from a resultant database table in one or more computer memories. In FIG. 1, the computer memory 8 may actually include one or more computer memories. A database table's alternate key is a unique index placed upon the database table in one or more computer memories by the database management system implemented by a computer processor, such as computer processor 4 in FIG. 1 and used to select data records from the database table.

Business key—In an entity-relationship diagram, a data entity's business key is typically based solely upon one or more data attributes of significance to a business. The business key may also be declared as a primary key or as an alternate key by a computer user utilizing a CASE tool or data modeling tool that is executing on a computer processor such as in one or more computer memories. There may be one or more business keys declared, for each data entity in the data model and all business keys may be database instantiated by executing computer software such as a database management system into the database as unique indexes associated with database tables.

CASE tool—A CASE tool is a computer software package that is executed on a computer processor, such as computer processor 4 of FIG. 1, for the purpose of developing and documenting data systems. CASE stands for Computer Aided Software Engineering. Generally, speaking, most CASE tools include a data modeling component to develop data models, to develop entity-relationship diagrams, to manage metadata and to aid in designing and implementing database tables.

Database—A database is generally a grouping of data values typically stored in a computer memory and organized for convenient access. More specific to this patent application, a database is a defined data structure, generally stored in computer memory, comprised of database tables, database columns, database indexes, foreign key constraints and other database objects defined using a computer-based database management system. In the present application, a database management system is a computer software application for maintaining database objects as well as database data values.

Database access path—A database access path results from the defined metadata commonality and from the defined data value commonality that allows for the combination of data records in computer memory from two database tables. The combined data records are formed into a single result set of metadata and data values that can be displayed on the display device 6 of the apparatus 1 of FIG. 1 or stored in a computer memory 8 of the apparatus 1 of FIG. 1. Within a single database, these database access paths are often defined as foreign key constraints within the computer-based database management system that are stored in computer memory, such as in computer memory 8.

Database bridge—A database bridge is constructed by adding the same database table to each of two different databases that can be stored in the computer memory 8 of the apparatus 1 of FIG. 1. This added database table will provide metadata commonality to each of the two previously heterogeneous databases. The added database table must be populated with data records for both databases using a standard method so that the data records are consistent and are a basis of data set commonality for both databases. In addition to the added database table, foreign key constraints between the added database table and other existing database tables in each database will provide one or more database access paths into each database from the added database table. This added database table provides a bridge between the two previously isolated networks of database access paths within each database that can be stored in the computer memory 8 of the apparatus 1 of FIG. 1. The database bridge is a method used to promote the combination of data records between two data sets that were previously isolated in two databases.

Database index—A database index is a type of database object stored in computer memory that is associated to a database table. A database index may be comprised of a single database table column or be comprised of multiple database table columns from the same database table. A database index may be designed as a unique index, which may use a key data value only once per database table, or designed as a non-unique index, which may repeat key data values in that database table. Database indexes are used to maintain the data value integrity of the database table data records as well as to aid in the rapid retrieval of specific data records from a database table.

Database integration—Database integration is the process of designing new databases or converting existing databases to conform to a set of metadata standards and a set of data record standards. The result of database integration is a group of databases that can be stored in a computer memory, such as the computer memory 8 of the apparatus 1 of FIG. 1, where their data sets may be combined into a consistent data set across the group of databases.

Database instantiation—The process of database instantiation is used to construct database objects that are available within a database through use of, for example, interactive device 2 and computer processor 4 shown in FIG. 1 to a database user. These database objects are created, maintained and deleted by a typically very complex computer software program referred to as a database management system. A database management system is a computer program that executes on a computer or computer processor and that may be used to support multiple databases on one or more computers or computer processors. A database created under a database management system is stored in computer memory. This database instantiation process is often controlled by another computer software program such as a data modeling tool or a CASE tool. CASE stands for Computer Aided Software Engineering. Once a data model ("data model" is defined later) has been developed within the data model tool or the CASE tool, that data model is forward engineered. This process of forward engineering, which may be programmed on a computer program, instructs the database management system to construct these database objects such as database tables, database table indexes, and database table constraints. The process of database instantiation converts the data model objects and metadata into database objects. Each data entity of the data model is converted into a database table, which is stored in computer memory, such as in computer memory 8 shown in FIG. 1, where each data attribute of the data model becomes a column within a database table stored in computer memory. The metadata associated with each data attribute of the data model are used to define the data types for each database column, as well as the column's data lengths, the column's precision, and whether the column must be populated with data for each data record. The data model keys such as primary keys, alternate keys, and foreign keys, become database table unique and non-unique indexes.

Database referential integrity—Referential integrity is a process, most often managed by a computer-based database management system database that is stored in a computer memory of the apparatus of FIG. 1, used to insure the consistency and integrity of data values stored within a computer memory as a database. Database referential integrity is related to joining data records stored in a database table to the data records stored in another database table via a database access path often instantiated in a database as a foreign key constraint.

Data entity—A data entity is a basic component of an entity-relationship diagram that can be displayed on the display device 6 of the apparatus 1 of FIG. 1 and that is stored in a computer memory such as the computer memory 8 of the apparatus 1 shown in FIG. 1. Each data entity of the entity-relationship diagram will be given a name to uniquely identify that data entity from all other data entities of the entity-relationship diagram. When the database is formed from the entity-relationship diagram, each data entity typically is instantiated in the database as a single database table in computer memory. In addition, a data entity includes a list of data attributes, which, when the database is formed, becomes the list of database columns. Each data entity generally has a primary key declared based upon one or more of the data attributes listed for that data entity. Each data entity may also have alternate keys declared also based upon one or more of the data attributes listed for that data entity. When the database is formed from the entity-relationship diagram, the primary key and the alternate keys are typically instantiated as unique database table indexes in computer memory.

Data entity relationship—A data entity relationship is a connector or link, which is stored in one or more computer memories, such as in computer memory 8, between two data entities in an entity-relationship diagram. A data entity relationship provides a means of joining data attributes of one data entity with data attributes of another data entity. The data entity relationships are depicted graphically in entity-relationship diagrams as lines that begin attached to a first data entity and end with a filled circle on the dependent data entity. A data entity relationship causes the CASE computer software tool to duplicate the primary key data attributes or to duplicate an alternate key data attribute from a first data entity into the data entity that is dependent on the first data entity. The computer processor 4 may be programmed by a CASE tool computer software to permit a user via interactive device 2 to make relationships between data entities. The user, via interactive device 2, may select which of a first data entity's key data attributes will be duplicated by the CASE Tool computer software. These duplicated key data attributes are referred to as a foreign key data attributes in the dependent data entity. Upon database instantiation, a data entity relationship from the entity-relationship diagram is instantiated as a foreign key constraint, in one or more computer memories, such as computer memory 8.

Data model—A data model is a computer implemented repository of metadata, including entity-relationship diagrams, which may contain data entities, data attributes and data entity relationships that can be displayed on the display device 6 of the apparatus 1 of FIG. 1 or stored in the computer memory 8 of the apparatus 1 of FIG. 1. Data models are a method of designing database structures for one or more database management systems. When the data model is instantiated into a database, the data entities usually become a database table, while the data attributes become database columns and the data entity relationships become foreign key constraints.

Data modeling tool—A data modeling tool is a computer software program or package that is executed on a computer processor, such as the computer processor 4, for the purpose of developing data models. The data modeling tool supports the forward engineering of the entity-relationship diagram and metadata to a database instantiated on a computer that is executing the database management system of computer software.

Data record—A data record is a single row of data values in a database table stored in a computer memory, such as computer memory 8. Each data record will usually include a primary key value for uniquely identifying that data record. In addition, a data record may include alternate key values to provide alternative methods for finding unique data records in a computer memory, such as computer memory 8 in FIG. 1. A data record may also include foreign key values to allow linking of data records from multiple database tables.

Data record granularity—Data record granularity is a characteristic of a data record that details the scale or the level of detail represent in a data set. The greater the data record granularity, the deeper the level of detail represented by the data record. For example, a hierarchy of time periods with three levels of data record granularity may be defined within a database to represent a year, a month, and a day. In this example, a data record that represents a year time period is the least granular type of data record representation while a data record that represents a day time period is the most granular type of data record representation. Dimensional database tables most often contain data records that represent multiple discrete levels of data record granularity.

Data Registry—A data registry, for the purposes of this patent application, is a reference data set, stored in a computer memory that is established for the purpose of uniquely identifying and defining a complete set of data records that represent some specific subject area. For example, the International Standards Organization publishes many data registries such as the ISO 3166 data registry of standard country codes. The ISO 3166 data registry is composed of a set of data records, where this set of data records identify and define every recognized country in the world. Each data record contains two data field. The first data field is named the country code and each country code data value is used to uniquely identify one country. The second data field is named country name and each country name data value defines a single country. The ISO 3166 data registry of country codes may be used in many databases.

Data value—A data value is an alphanumeric string stored in a specific location in a computer memory such as a named data field. For example, a data value may be stored in a data field of a data entry form in a computer memory or in a specific cell of a spreadsheet or in a specific data column of a specific data record of a database table in computer memory. The interpretation of the actual value of the alphanumeric string is dependent upon the data type of the data field. For example, if the data type of a data field is numeric, only valid numeric values will be accepted into the data field.

Dimensional data—Dimensional data is reference data or master data that represents a hierarchy of several discrete levels of data record granularity. For example, dimensional data for geographical areas could have discrete levels of data record granularity such as the continent level, the country level, and the state level.

Entity-Relationship diagram—An entity-relationship diagram (ERD) is a graphical depiction of a database design that includes data entities, and includes data entity relationships that can be displayed on the display device 6 of the apparatus 1 of FIG. 1 or stored in a computer memory 8 of the apparatus 1 of FIG. 1. The depicted data entities represent potential database tables to be instantiated into a database. The depicted data entity relationships represent potential foreign key constraints to be instantiated into the same database and used to maintain referential integrity between the instantiated database tables. An ERD is always stored within a data model along with other metadata required to instantiate a database.

Foreign key—A foreign key provides a link, via a data entity relationship between two data entities in an entity-relationship diagram that is stored in computer memory. The data attributes from the primary key or a selected alternate key of a first data entity are duplicated into a second data entity which is now dependent upon the first data entity. These duplicated data attributes are referred to as foreign key data attributes. This link or data entity relationship, when database instantiated, instantiates a foreign key constraint that enforces referential integrity between the two database tables that result from the first data entity and from the dependent second data entity. Foreign key data attributes, when database instantiated, become foreign key database columns.

Foreign key constraint—A foreign key constraint is declared in a database management system as a means of implementing and maintaining database referential integrity between two data sets each of which is most often contained within different database tables. A foreign key constraint is normally designed in an entity-relationship diagram as a data entity relationship usually between two data entities. The first data entity, often referred to as the parent data entity, contributes one or more key data attributes to the second data entity, which is often referred to as the dependent data entity. In the parent data entity, a unique key, such as the primary key or an alternate key, has its data attributes copied into the dependent data entity's set of data attributes. These copied data attributes are referred to as the foreign key data attributes in the dependent data entity. When the entity-relationship diagram is instantiated into a database, the parent data entity becomes the parent database table, the dependent data entity becomes the dependent database table and the data entity relationship becomes the foreign key constraint. The foreign key data attributes, in the dependent data entity, are instantiated as foreign key database columns in the dependent database table. Foreign key constraints are stored in computer memory and are used by the database management system to enforce database referential integrity rules for creating, updating and deleting data records. Foreign key constraints are extremely important within a database because only data record sets with enforced referential integrity may be joined to form a consistent, combined set of data records. Each foreign key constraint in a database provides a bidirectional database access path between two database tables.

Fundamental business key data attribute—For the purposes of this patent application, a fundamental business key data attribute is a type of business key data attribute that may be used by itself or in combination with other business key data attributes to uniquely identify a unified boundary data entity. Fundamental business key data attributes have the following characteristics:

A fundamental business key data attribute is independent of any other data attributes in that it is not derived from other data attributes and may not be decomposed into multiple significant data attributes.

A fundamental business key data attribute may be defined at the most granular level of detail available.

A fundamental business key data attribute is a well-known defined standard.

A fundamental business key data attribute is a singularly defined standard.

There are several types of fundamental business key data attributes. The first type of fundamental business key data attributes is based upon fundamental measurements such as time, such as latitude and longitude, such as temperature, and such as weight all of which are classified as absolute fundamental business key data attributes. A second type of fundamental business key data attribute is based upon data registries. A data registry is a unique identifier that is assigned to something of significance. If that something of significance is a book, the Dewey Decimal System may be used as the data registry. If that something of significance is products, the Universal Product Code (UPC) may be used as a data registry for products. In the case of currency types, the ISO 4217 is an international standard data registry developed and maintained by the International Standards Organization (ISO) for the various currencies used around the world.

Fundamental business key database column—A fundamental business key database column is a column of a single database table that results from the database instantiation of a fundamental business key data attribute. The fundamental business key database column will also normally be a part of a unique database index that is associated with that database table.

Fundamental measurement—A fundamental measurement is a measurement based upon ordered qualitative observations that are not derived from other measurements. Examples of fundament measurements are the measurement of time, of weight, of distance, or of temperature. Within this patent, the measurement of a period of time such as a calendar year, or a calendar week are based upon the fundamental measurement of time for the start of the time period and for the end of the time period. While a residential postal address is not a fundamental measurement, because it is not based upon ordered qualitative observation, the latitude and longitude coordinates of the same residence would be considered a fundamental measurement.

Independent heterogeneous database—An independent heterogeneous database is a database that is designed without intended metadata commonality and without intended data set commonality with other databases. Most prior art databases are unique and are heterogeneous having no intended metadata commonality and no intended data set commonality with other databases. Also, databases designed by independent database design teams with no common metadata standards or with no common data standards result in independent heterogeneous databases. Currently, there are no general or universal database design standards for both metadata and data sets.

Independent heterogeneous entity-relationship diagram—An independent heterogeneous entity-relationship diagram is an entity-relationship diagram that is contained within a data model where the repository of metadata for that data model has been developed independent of other existing repositories of metadata.

Local boundary data entity—A local boundary data entity, of an entity-relationship diagram, represents the outer boundary of data entities upon which all other data entities are dependent. By analogy, the local boundary data entities are to an entity-relationship diagram what the edge pieces of a picture puzzle are to the puzzle itself. The local boundary data entities form the border or the outer edge of the entity-relationship diagram. In part, the local boundary data entities are the ultimate parent data entities of the data model. Once the data model is instantiated into a database, any database table instantiated from a local database boundary data entity becomes a local boundary database table.

Primary key—A primary key is comprised of one or more data attributes within a data entity that are declared using a CASE tool or a data modeling tool executing on computer processor 4 which is programmed to store the declared primary key in computer memory, such as computer memory 8 of FIG. 1. The primary key of a data entity is the primary method of uniquely identifying data records within a database table. In a database, the primary key is instantiated as the primary unique index of the database table that was instantiated from the data entity. The primary unique index is used as a means of rapidly selecting unique data records from the database table.

Repository of metadata—A repository of metadata is a compilation of information about data. In this patent, the repository of metadata is compiled to support the design and the formation of database structures and to support the creation data records for various database tables. To support the design of database structures, data entities, data attributes, data entity relationships, primary keys, and alternate key are examples of metadata defined in a data model. The entity-relationship diagrams developed within data models are also considered to be a form of metadata complied in the repository of metadata. To support the formation of database structures, database tables, database columns, foreign key constrains and unique indexes are examples of metadata defined in the Database Management System which is a software application. Processes used to populate data records into database tables may also stored in the repository of metadata. A repository of metadata may also be referred to as a dictionary of metadata within this patent.

Standardized homogeneous database—For this patent, a standardized homogenous database is a database, stored in computer memory, that includes one or more unified boundary database tables. In addition, the standardized homogeneous database may also include database tables that conform to a metadata standard developed for use specifically with the unified boundary database tables. This metadata standard is detailed in the unified metadata dictionary. A standardized homogeneous database is often instantiated from a standardized homogeneous data model.

Summary database table—For this patent, a summary database table is a database table that is not a unified boundary database table, but the summary database tables do conform to the metadata standard developed for use specifically with unified boundary database tables. A summary database table, that is stored in computer memory, will normally contain aggregate data records composed from the transactional data records of prior art database tables. The summary database tables along with the unified boundary database tables combine to form the homogeneous database layer for a standardized homogeneous database. In a data model, summary data entities are most often used with data warehouse type entity-relationship diagrams. In a data warehouse type entity-relationship diagram, data entities are normally classified as either dimensional data entities or fact data entities. The dimensional data entities contain reference data or master data while the fact data entities normally contain quantitative type data. Fact data entities are normally dependent upon dimensional data entities as they inherit foreign key data attributes from the dimensional data entities. A fact data entity of a data warehouse data model is a form of summary data entity. Aggregate data entities formed or mathematically derived from data attributes of fact data entities of a data warehouse type entity-relationship diagram are also considered summary data entities. When database instantiated, the summary data entities form summary database tables within the database.

Surrogate primary key—A surrogate primary key is a type of data entity primary key based upon a single numeric data attribute or a database table primary key that is based upon a single numeric database column populated with a unique set of numeric values. The surrogate primary key has no business significance and is therefore not a part of a business key.

Ultimate parent data entity—Within a data model, ultimate data entities are data entities that do not inherit foreign key data attributes from other data entities with the exception that:

An ultimate parent data entity may inherit code type data attributes from one or more decode type data entities. Decode data entities are an artifact of a data normalization process for the removal of repeating data values from a set of data records. For example, state codes are repeatedly found in a set of postal address data records and as such may be removed to a decode data entity.

An ultimate parent data entity may recursively inherit data attributes from itself.

On the other hand, ultimate parent data entities contribute foreign key data attributes to other data entities. Ultimate parent data entities are always a major part of the local boundary data entities of any data model.

Unified boundary—In an entity-relationship diagram, a unified boundary data entity is a reusable data entity designed to represent the outer most boundary or the border of all possible data entities. A complete set of unified boundary data entities will completely encapsulate all other data entities within any data model. When unified boundary data entities are instantiated into a database, the resultant unified boundary database tables define the outer edge for the database. Furthermore, unified boundary database tables are intended to form the outer edge for any database and thus the basis for integrating data records from multiple independently designed databases that now include the same unified boundary database tables.

Unified metadata dictionary—For this patent, the unified metadata dictionary is a repository of metadata used to define data entities and data attributes that, along with the unified boundary data entities, will form the homogeneous layer for multiple data models. This repository of metadata may be displayed on a display device of the apparatus of FIG. 1 or stored in a computer memory of the apparatus of FIG. 1. When a data model based upon unified boundary data entities and unified metadata defined data entities is instantiated into a database that is stored in computer memory, that database will have the metadata commonality needed to share data records with other so defined databases.

In accordance with at least one embodiment of the present invention, a method is provided, which can be called a "method to create standardized homogenous databases". This method is a method for configuring, designing, and/or implementing database tables and data models in one or more computer memories, such as computer memory 8 of FIG. 1 which gives a person who defines data models and database tables a predefined framework into which the remainder of the data entities and database tables are developed.

FIG. 1 shows a diagram of an apparatus 1 in accordance with an embodiment of the present invention. The apparatus 1 includes an interactive device 2, a computer processor 4, a display device 6, and a computer memory 8. Computer memory 8 may include any type of computer memory, including long term memory such as disk memory in addition to computer random access memory which may lose its values when power is removed. The computer memory 8 may include one or more computer memories. The interactive device 2, the display device 6, and the computer memory 8 communicate with the computer processor 4 via communications links 2a, 6a, and 8a respectively, which may be electronic, computer software, optical, wireless or any other type of communications links. The computer processor 4 may be programmed by computer software to implement the method to create multiple standardized homogenous databases in accordance with the present invention to create databases in the computer memory 8, such as shown by FIG. 1.

Figure 2:
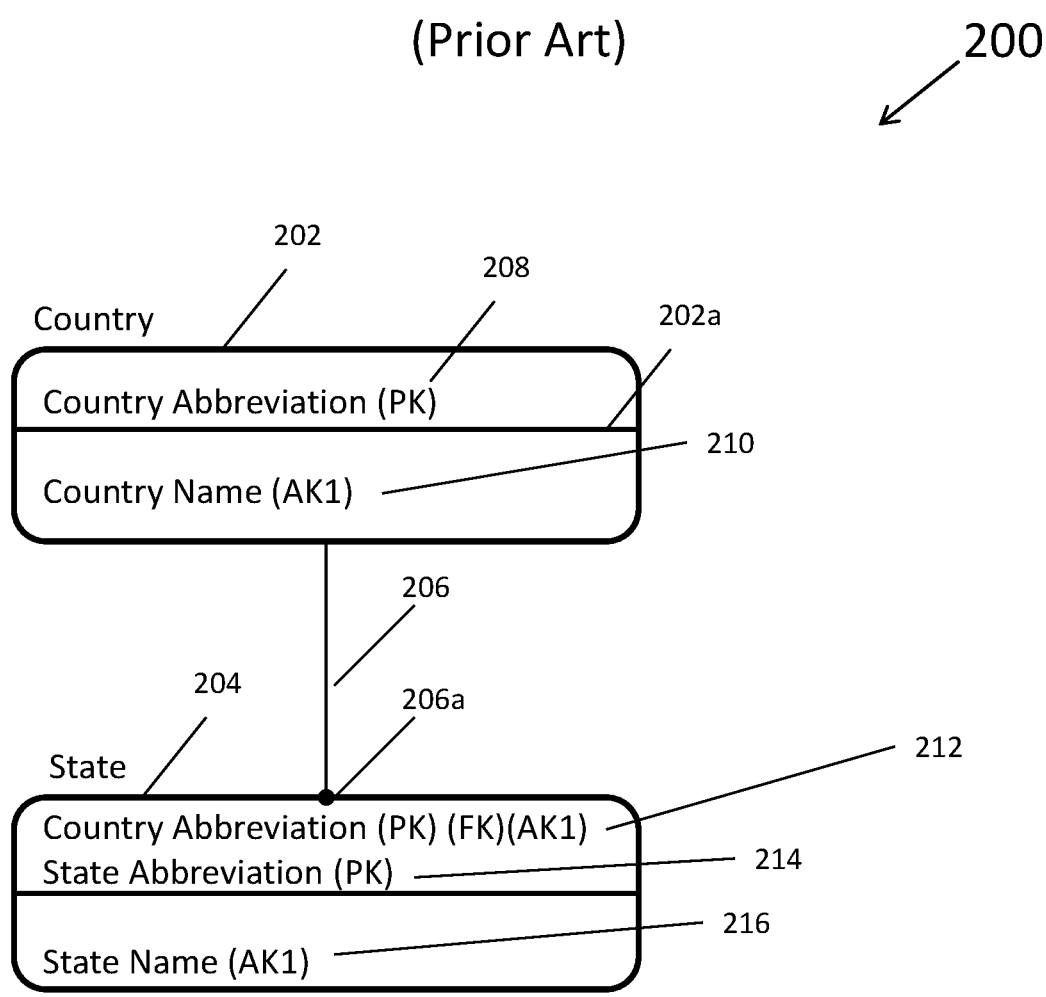
FIG. 2 depicts a prior art simple entity-relationship diagram of a country data entity and a state data entity and a data entity relationship linking the two data entities together that can be displayed on a display device of the apparatus of FIG. 1 or stored in a computer memory of the apparatus of FIG. 1.

FIG. 2 shows ERD (entity-relationship diagram) 200, which may be stored in the computer memory 8 of FIG. 1. The ERD 200 contains two entities, data entities 202 and 204, combined with a single data entity relationship 206 that connects these two data entities. In this representation of an ERD, ERD 200, each of data entities 202 and 204 are represented by a rounded-corner rectangle while the data entity relationship 206 is represented by a line terminated with a filled circle 206a. Each data entity, such as each of 202 and 204, represents a group of related data attributes, such as the data attribute 210, which is named country name, and data attribute 208, which is named country abbreviation, for data entity 202. In this notation of data entities, the data attributes above a line in the rounded-cornered rectangle, such as for example, above line 202a for data entity 202, are declared to be the primary key of the data entity. The primary key data attributes of each data entity are also denoted as such by the (PK) which follows the data attribute's name. This primary key is a unique identifier for the data entity. In addition to the data entity's primary key, each data entity may have zero, one or more alternate keys defined. In FIG. 2, both data entities 202 and 204 contain a single alternate key denoted by the (AK1) following the alternate key's data attributes. In data entity 202, the alternate key is declared upon the single data attribute 210, which is named country name. In data entity 204, the alternate key is a composite alternate key composed from the data attribute 212, which is named country abbreviation, and data attribute 216, which is named state name. The data entity relationships of entity-relationship diagrams, such as ERD 200, depict a link, normally between two data entities, that allow data attributes from a first data entity, such as data entity 202, to be related to data attributes from the second data entity, such as data entity 204.

Data entity relationship 206, shown in FIG. 2, links the first data entity 202 to the second data entity 204. Note that the data entity 204 contains data attribute 212, denoted by (FK). Data attribute 212 is inherited from the primary key of the data entity 202, which is data attribute 208. This inheritance of a first data entity's primary key data attributes or one of that data entity's alternate key data attributes into a second data entity is referred to as a foreign key thus the denotation of (FK).

FIG. 3 is database 300 that results from the database instantiation of the data model 200 depicted in FIG. 2. Databases table 302 and 304 are instantiated into database 300 from data entity 202 and 204 respectively of ERD 200 shown in FIG. 2. The primary key index of database table 302 is based upon database column 310, which is instantiated from primary key data attribute 208 of ERD 200. Database table 304 is instantiated into database 300 from data entity 204 in FIG. 2. The primary key index for database table 304 is a composite index based upon database columns 320 and 322, which are instantiated from primary key data attributes 212 and 214 of EDR 200.

Beyond the database tables, foreign key constraints are another important type of database object that is instantiated into any relational database. Foreign key constraint 306 of database 300, shown in FIG. 3, is instantiated from data entity relationship 206 of ERD 200 shown in FIG. 2. Foreign key constraint 306 of database 300 shown in FIG. 3 maintains database referential integrity between database column 310 of database table 302 and database column 320 of database table 304. Once a foreign key constraint is declared, the database management system will enforce the database referential integrity rules for that foreign key constraint.

In any relational database, the foreign key constraints are very important. Foreign key constraints maintain both the database referential integrity of the data records and provide bidirectional database access paths between database tables. It is important to note that database referential integrity and database access paths are only maintained within a single database. Prior art databases do not allow database referential integrity across databases and do not provide database access paths between databases.

FIG. 4 depicts spreadsheet 400 of a data set that results from joining the data records from database table 302 to the data records of database table 304 from database 300 shown in FIG. 3. In spreadsheet 400, columns 404, 406, 408 and 410 results from database columns 310 and 312 of database table 302 and database columns 322 and 324 from database table 304, respectively.

With the rules of database referential integrity enforced in database 300, foreign key constraint 306 maintains the bidirectional database access path between database table 302 and database table 304. For example, from data record 314 of database table 302, one may use the data value "USA" from database column 310, to join with all related data records in database table 304. All the data records shown in database table 304 that have in database column 320 with the data value "USA" will be retrieved. Also, any data record in database table 304 may now access any related data record in database table 302 via the foreign key constraint 306. For example, data record 326 of database table 304 may be combined with the single data record 314 of database table 302 since their data values in database columns 310 and 320 are equal to the data value "USA".

It is important to note that retrieving data set results from any database is based, in a large part, upon metadata, particularly the name of the database tables and the names of the database columns within the database tables.

Figure 5:
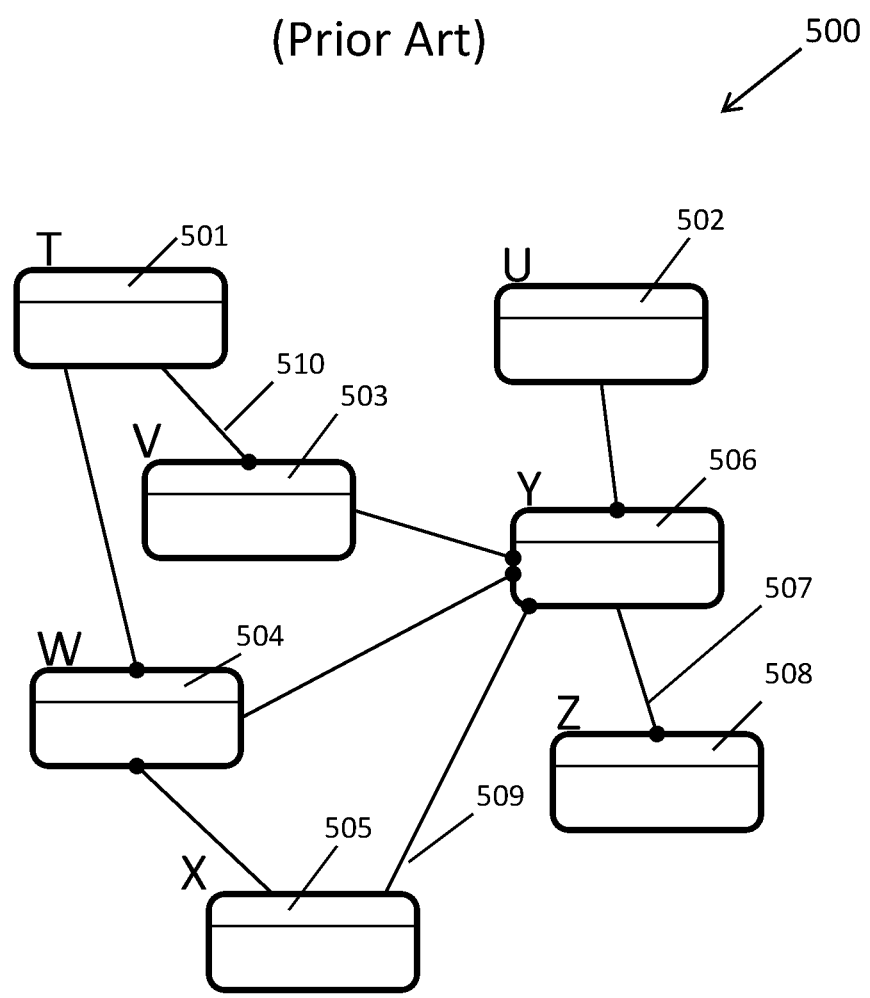
FIG. 5 depicts a prior art independently designed heterogeneous entity-relationship diagram.

FIG. 5 is a depiction of a prior art ERD (entity-relationship diagram) 500 that can be displayed on the display device 6 of the apparatus 1 of FIG. 1 or stored in a computer memory, such as computer memory 8, of the apparatus 1 of FIG. 1. The ERD 500 is a simplified diagram which shows only the data entities and the data entity relationships but does not show the data attributes of each data entity such as data entities 501-506, and 508. In ERD 500, there are seven data entities 501, 502, 503, 504, 505, 506 and 508. All data entities of an ERD, such as the data entities shown in FIG. 5, are assigned a unique data entity name. In the ERD 500 of FIG. 5, data entities 501, 502, 503, 504, 505, 506, and 508 are associated to the metadata entity names of T, U, V, W, X, Y, and Z respectively.

ERD 500 is contained in a data model that is stored in computer memory, such as computer memory 8 of FIG. 1. ERD 500 was independently designed as no consideration of its dependence to any other data model influenced its design. Data models that are independently designed or address different subject areas of data may be referred to as independent heterogeneous data models. Overall data entities and data entity relationships, as well as data entity names, data attribute names, data attribute data types and more, differ from one independent heterogeneous designed data model to the next. Independent heterogeneous data models, when instantiated, become independent heterogeneous databases.

It is very important to note that each data entity of the ERD 500 of FIG. 5 has at least one data entity relationship associated with it such as data entity relationship 507. In very few instances, would a data entity exist that had no data entity relationships with any other data entity. As such, and by design, each data entity may be associated to every other data entity in the data model via the network of data entity relationships. For example, data entity 508 has a direct relation with data entity 506 via data entity relationship 507. Data entity 506 has a direct relation with data entity 505 via data entity relationship 509. As a result, data entity 508 has an indirect association to data entity 505 via data entity relationship 507, data entity 506, and data entity relationship 509. Again, within a data model, the vast majority of data entities have data entity relationships designed to associate any data entity to any other data entity in the data model.

One critical aspect of data modeling is the design of the network of data entity relationships that will be instantiated in the resulting database as foreign key constraints. This network of data entity relationships is used to maintain the database referential integrity of the instantiated database as well as allowing for the combining of data records from a combination of database tables.

Figure 6:
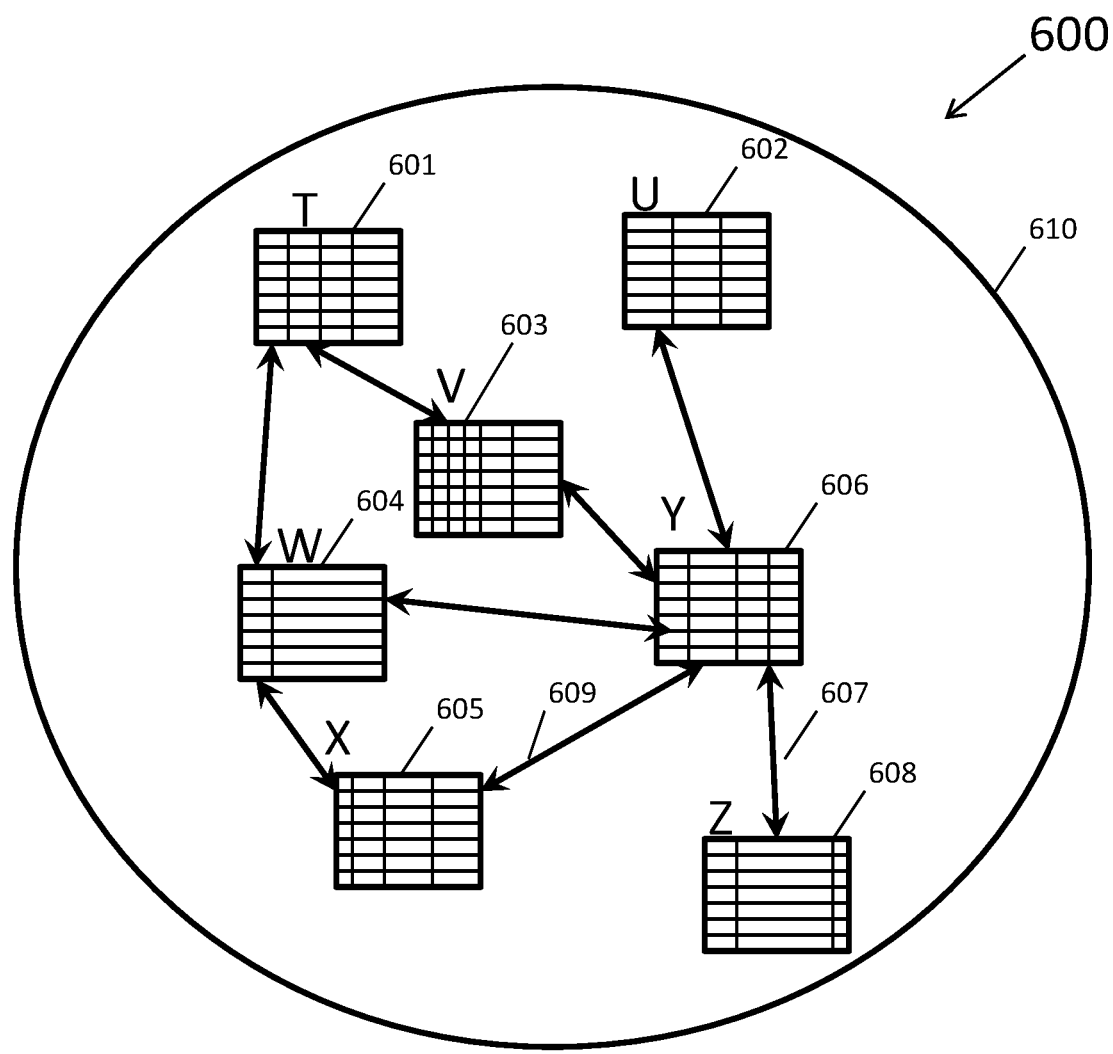
FIG. 6 depicts a prior art independently designed database that is instantiated from the data model that contains the entity-relationship diagram shown in FIG. 5.

FIG. 6 depicts database 600 which was instantiated from independently designed ERD 500 shown in FIG. 5. Database 600 is represented as a group of database tables (601, 602, 603, 604, 605, 606, and 608) and a group of foreign key constraints (double ended arrows), such as foreign key constraint 607. All of these database tables and foreign key constraints are encapsulated within a database boundary 610. The database 600 is shown in a simplified form in FIG. 6 which shows the database tables and the foreign key constraints but does not show the database columns for each database table and all details regarding the database 600 are not shown in FIG. 6.

Database table 601, which is named T in FIG. 6, was instantiated into database 600 from the data entity 501 in ERD 500 shown in FIG. 5. Likewise, database table 602, which is named U in FIG. 6, was instantiated into database 600 from the data entity 502 in ERD 500 shown in FIG. 5. Database tables 603, 604, 605, 606, and 608 of database 600 as shown in FIG. 6 were instantiated from data entities 503, 504, 505, 506, and 508 respectively of ERD 500 shown in FIG. 5. In addition, each data entity relationship from the ERD 500 shown in FIG. 5 was instantiated into database 600 as foreign key constraints. For example, data entity relationship 507 of ERD 500, which relates data entity 506 and data entity 508, was instantiated as foreign key constraint 607 in database 600. Foreign key constraint 607 enforces database referential integrity and provides a bidirectional database access path between database table 606 and database table 608 of database 600 as depicted in FIG. 6.

Each database table may be directly or indirectly associated to other database tables in within a database via foreign key constraints. Each foreign key constraint enforces referential integrity between two database tables, which as a result, also provides a consistent bidirectional database access path between the same database tables. For example, in database 600 shown in FIG. 6, database table 608 has a direct bidirectional access path to database table 606 via foreign key constraint 607. Database table 606 has a direct bidirectional database access path to database table 605 via foreign key constraint 609. Therefore, database table 608 has an indirect bidirectional database access path to database table 605 via foreign key constraint 607, database table 606, and foreign key constraint 609. Again, within a database, the vast majority of database tables have foreign key constraints designed to associate any database table to any other database table within the database.

Each database, such as database 600, contains a consistent data set that is isolated from other consistent data sets contained within other prior art databases. This data set isolation artifact for prior art databases is the reason data integration has become so prevalent in the information technology industry today. Currently, data integration is a process based upon extracting data sets from multiple databases, followed by data transformations of these extracted data sets into a common data set, and then loading the consolidated common data set into a different database. A database boundary, such as database boundary 610, marks the end of the network of bidirectional database access paths for that particular prior art database. A database boundary also marks the outer limit of the prior art database, such as database 600, that is denoted by the local boundary database tables. The database boundary causes data set isolation with each prior art database.

Figure 7:
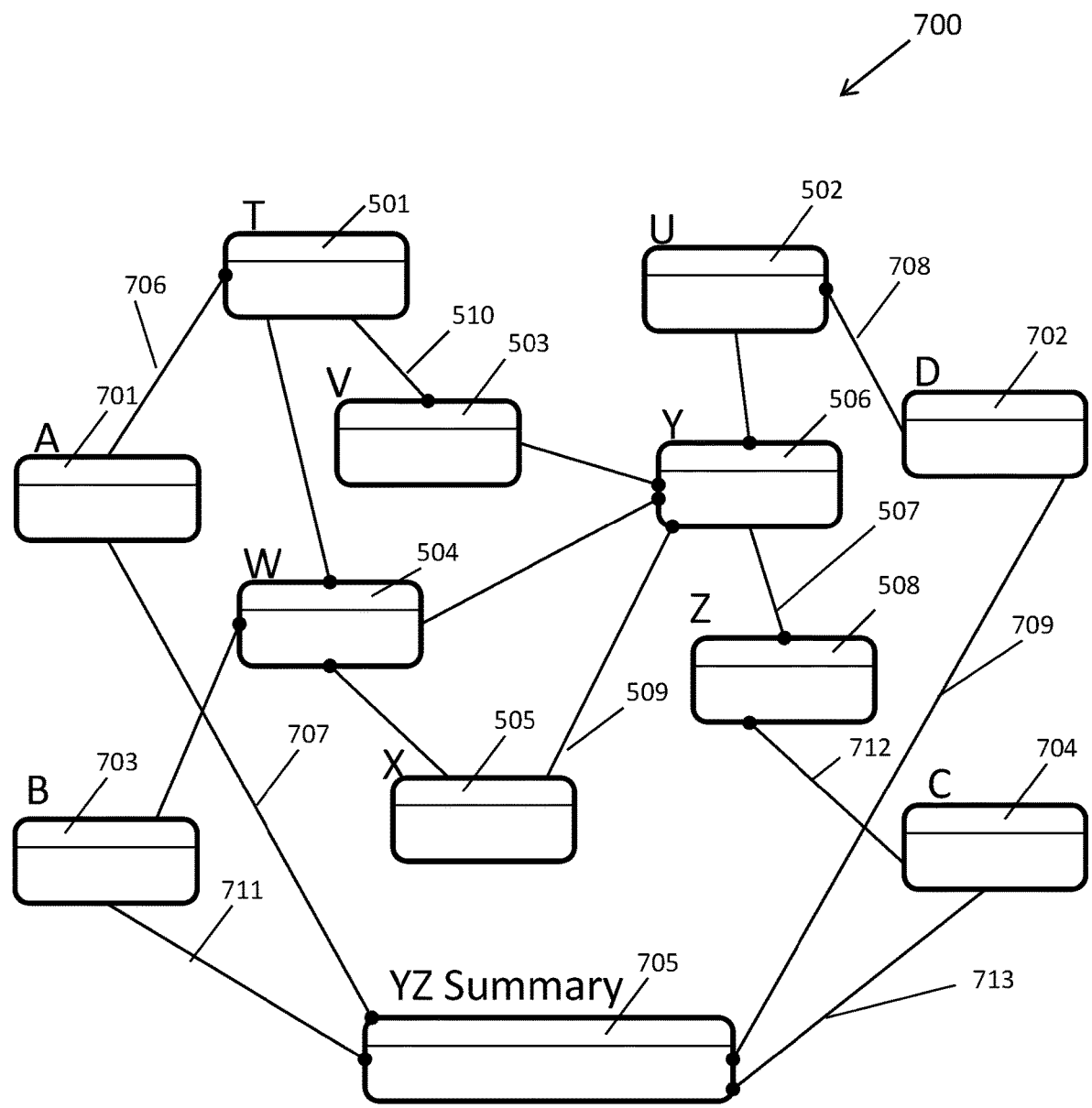
FIG. 7 depicts the result of converting the data model shown in FIG. 5 into a standardized homogeneous data model, in accordance with an embodiment of the present invention, that can be displayed on a display device of the apparatus of FIG. 1 or stored in a computer memory of the apparatus of FIG. 1.

FIG. 7 shows ERD 700, which results from the conversion of the independently designed ERD 500 shown in FIG. 5 into standardized homogeneous ERD 700. FIG. 7 is a simplified diagram that shows only the data entities and the data entity relationships but does not show the data attributes associated with each data entity that would be in ERD 700. In both ERDs 500 and 700, data entities 501, 502, 503, 504, 505, 506 and 508 represent the same data entities. Also, data entity relationships 507, 509 and 510 represent the same data entity relationships in both ERD 500 and ERD 700.

This conversion of target ERD 500 into standardized homogeneous ERD 700 is accomplished by adding four unified boundary data entities 701, 702, 703, and 704 along with summary database table 705 to target ERD 500, the result of which is shown in ERD 700 of FIG. 7. Along with the addition of these data entities, data entity relationships are also added. For example, unified boundary data entity 701 is related to data entity 501 via data entity relationship 706. Additionally, unified boundary data entity 701 is related to the summary data entity 705 via data entity relationship 707.

The unified boundary data entities are added to a target ERD to displace the local boundary data entities. That is, the unified boundary data entities become the database boundary data entities while the previously local boundary data entities become dependent upon the unified boundary data entities. The unified boundary data entities are added to convert the unique local database boundary of the target ERD into a standard unified database boundary that defines a reusable database boundary for multiple databases.

Summary data entities, such as data entity 705 of ERD 700, adds a universally defined layer of metadata at a level of data aggregation determined by the summary data entity's data entity relationships. Data entities 701, 702, 703, 704, and 705 form a homogeneous layer of metadata for ERD 700 which is homogeneous because it is reused in multiple ERD's. Data entities 501, 502, 503, 504, 505, 506, and 508 remain heterogeneous in their metadata.

The overall effect of adding the unified boundary data entities and the summary data entities to an ERD is very dramatic. ERDs that have local boundaries have no deliberate metadata commonality and as such represent independent and isolated data storage areas. Displacement of the local database boundary data entities of any prior art data model by the reusable unified boundary data entities promotes the integration of metadata between any ERD that also have the same reusable unified boundary data entities.

When the unified boundary data entities and summary data entities are added to a target ERD, a data warehouse type ERD has now been integrated with the existing transactional ERD. In the case of data model 700, which is shown in FIG. 7, the unified boundary data entities 701, 702, 703, and 704 would be the dimensional data entities while summary data entity 705 would be the fact data entity of the data warehouse. Since the data warehouse ERD and the transactional ERD are both in the same integrated data model, transactional data will also be directly available to the data warehouse without major transformations in the instantiated database.

Figure 8:
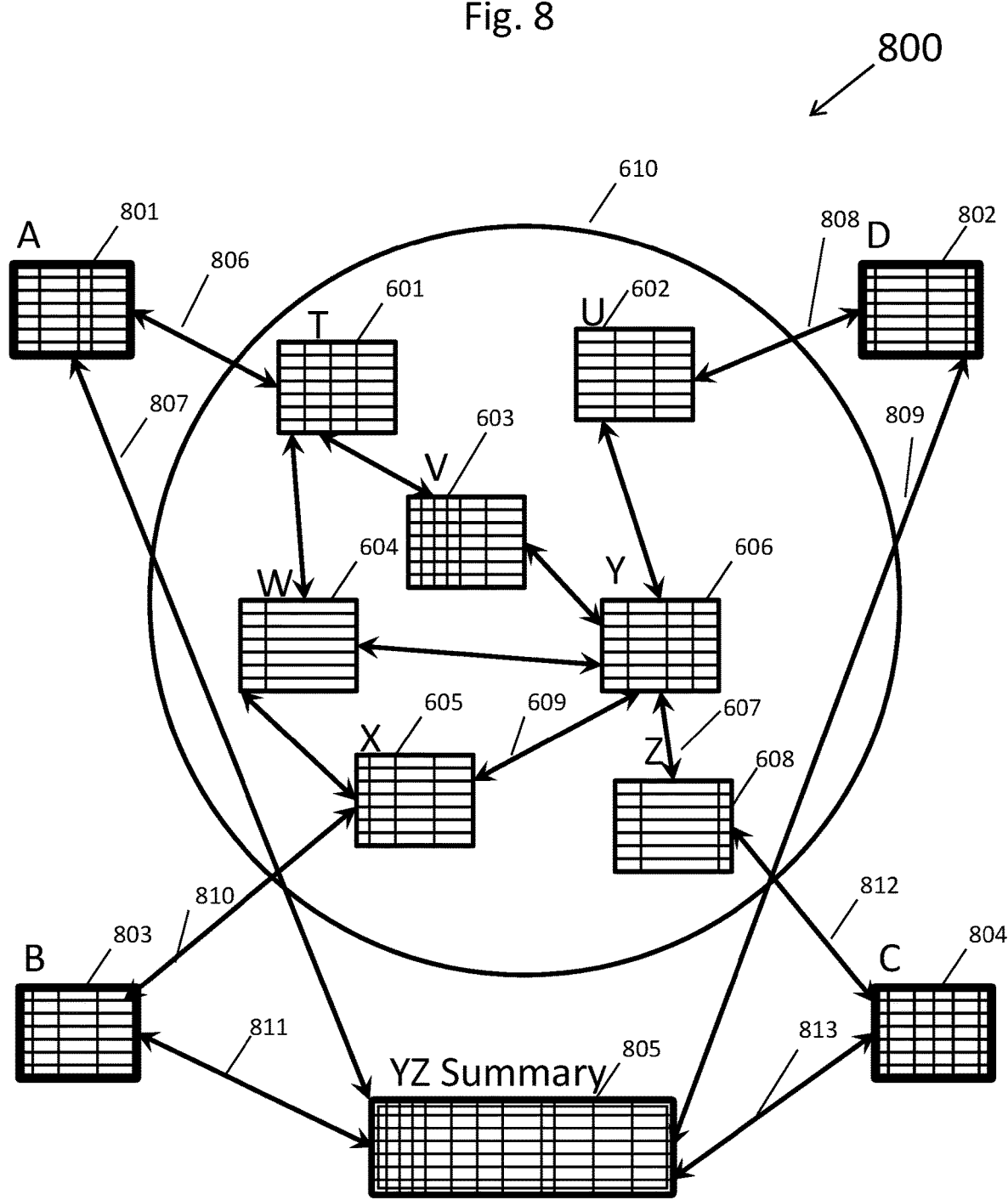
FIG. 8 depicts the result of converting the database as shown in FIG. 6 into a standardized homogeneous database, in accordance with an embodiment of the present invention, that can be displayed on a display device of the apparatus of FIG. 1 or stored in a computer memory of the apparatus of FIG. 1.

FIG. 8 depicts standardized homogeneous database 800, which may be stored in computer memory 8, that results from the database instantiation of ERD 700 shown in FIG. 7. FIG. 8 is a simplified diagram that shows only the database tables and the foreign key constraints and does not show the database columns for each database table or all the details of database 800. Database tables 601, 602, 603, 604, 605, 606 and 608 of database 800 as shown in FIG. 8 represent the same database tables as database tables 601, 602, 603, 604, 605, 606, and 608 of database 600 as shown in FIG. 6. Foreign key constraints 607 and 609 are the same foreign key constraints in both database 600 and database 800. Database local boundary 610 shown in database 800 contains the heterogeneous database and is the same database boundary as shown in database 600. Instantiation of the data model that contains standardized homogeneous ERD 700 results in adding four unified boundary database tables 801, 802, 803 and 804 along with summary database table 805 to the existing database 600. Along with the addition of these unified boundary database tables, foreign key constraints 806, 807, 808, 809, 810, 811, 812 and 813 are also added.

Database tables 801, 802, 803, 804 and 805 form a homogeneous layer of metadata and data records for database 800. Database tables 601, 602, 603, 604, 605, 606, and 608 remain heterogeneous in their metadata, in their data records and in their data value domains. The four unified boundary database tables are used to enrich the reference data in the original database and to provide homogeneous reference metadata to any database. Summary database tables, such as summary database table 805, add a universally defined layer of metadata and a universally defined set of data records to the database. It is important to note that data access paths are available between the original heterogeneous database tables and the new homogeneous database layer of database tables.

By converting a database, such as database 600 shown in FIG. 6, into a standardized homogeneous database, such as database 800 shown in FIG. 8, a number of heterogeneous database issues are addressed. Heterogeneous databases are very well isolated from other databases because of their heterogeneous metadata and their heterogeneous data records. Basically, heterogeneous databases have no deliberate metadata commonality or data record commonality at the level of granularity needed to eliminate the data isolation. The unique local database boundaries of heterogeneous databases are converted to a unified boundary in the standardized homogeneous database. This unified boundary becomes the foundation for integrating metadata and data sets from multiple databases since standard reference data values are reused and since standard data structures are reused in multiple standardized homogeneous databases.

The metadata isolation and the data isolation caused by heterogeneous databases make the integration of metadata and data sets very difficult, tedious, and expensive. One common approach is to integrate data from multiple databases into an integrated database such as a data warehouse or a data integration hub. Unfortunately, the resultant integrated database is itself an isolated heterogeneous database that has no deliberate commonality with any other database. With the use of standardized homogeneous databases, such as database 800 shown in FIG. 8, each database is formed upon a foundation of unified boundary database tables. Therefore, all standardized homogenous databases contain deliberate metadata commonality and data commonality that allows for the integration of data across multiple databases.

When a new database system is defined, unified boundary data entities may be incorporated into the data model used to design the new database system. Once the database system design is completed in the data model, that data model may be instantiated into a database management system as a new database. In this case, the unified boundary database tables will become an integral part of the database objects available to any database software applications developed to interact with the new database. This newly instantiated database will be a standardized homogeneous database because it will have a unified database boundary that is defined by the combination of unified boundary database tables.

A more challenging use of the unified boundary database tables is to incorporate these database tables into an already existing database where that existing database's tables are already populated with data records. This more challenging use is the process for the conversion of an existing populated prior art database into a standardized homogeneous database. The process for this database conversion is addressed below in flow chart 900 shown in FIG. 9.

Figure 9:
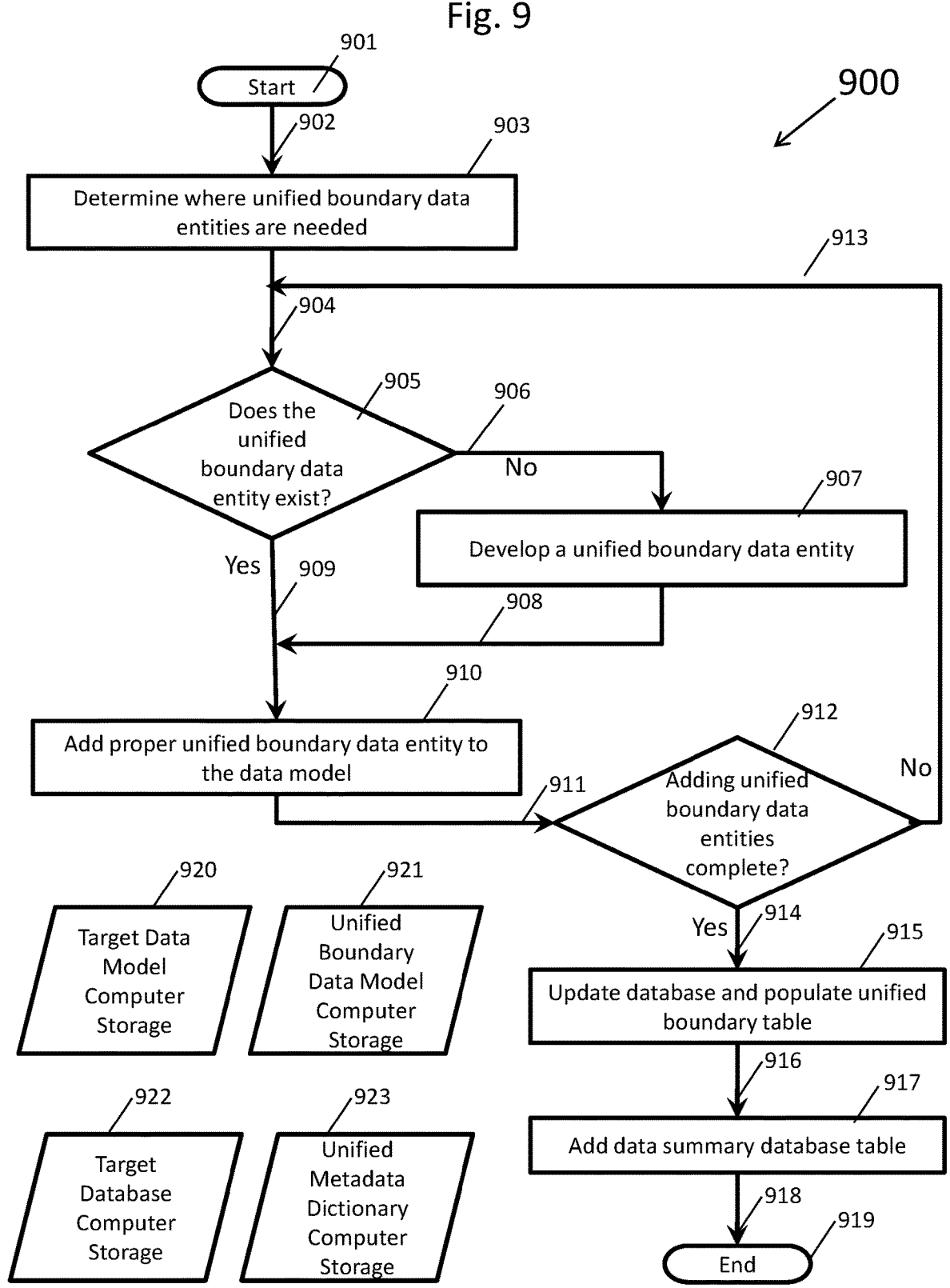
FIG. 9 shows a master flow chart depicting a process, which can be implemented by the computer processor of FIG. 1, for converting an existing database, such as the database shown in FIG. 6, into a standardized homogeneous database, such as that converted database shown in FIG. 8.

FIG. 9 shows flow chart 900 of the process used to convert any independent heterogeneous database, such as database 600 as shown in FIG. 6, into a standardized homogeneous database such as database 800 as shown in FIG. 8. The process shown in FIG. 9, can be implemented by a computer processor, such as computer processor 4 of FIG. 1, executing computer software stored in computer memory, such as computer memory 8. In conjunction with this database conversion, the conversion of an independent heterogeneous ERD into a standardized homogeneous ERD is also addressed in flow chart 900, such as the conversion of independent heterogeneous ERD 500 to standardized homogeneous ERD 700.

Flow chart 900 is comprised of process terminators 901 and 919, of activities 903, 907, 910, 915 and 917, of decisions 905, and 912, of process flow lines 902, 904, 906, 908, 909, 911, 913, 914, 916, and 918, and of computer data storage areas 920, 921, 922 and 923. Flow chart 900 shown in FIG. 9 is a high-level flow chart that has activities 903, 907, 910, 915 and 917 expanded in detailed flow charts 1000, 1100, 1300, 1500 and 1900 shown in FIG. 10, FIG. 11, FIG. 13, FIG. 15 and FIG. 19 respectively. Computer data storage areas 920, 921, 922, and 923 are permanent data storage repositories managed by a computer processor, such as computer processor 4 and stored in a computer memory 4 of the apparatus 1 of FIG. 1.

In order to begin the conversion of a target prior art database into a standardized homogeneous database, the computer processor 4 normally begin with the data model used to instantiate the target database, such as data model 500 shown in FIG. 5 which is used to instantiate target prior art database 600 shown in FIG. 6. Data models are most often developed by one or more persons using a computer software program referred to as a CASE tool or a data modeling tool. This computer software program can be executed by the computer processor 4 of FIG. 1 and stored in computer memory 8 also of FIG. 1. Standard prior art database modifications are most often achieved by modifying the target data model before instantiating these modified database objects into the target database. Within flow chart 900 shown in FIG. 9, this same approach is taken. That is, the data model is always modified before database changes are instantiated.

Figure 10:
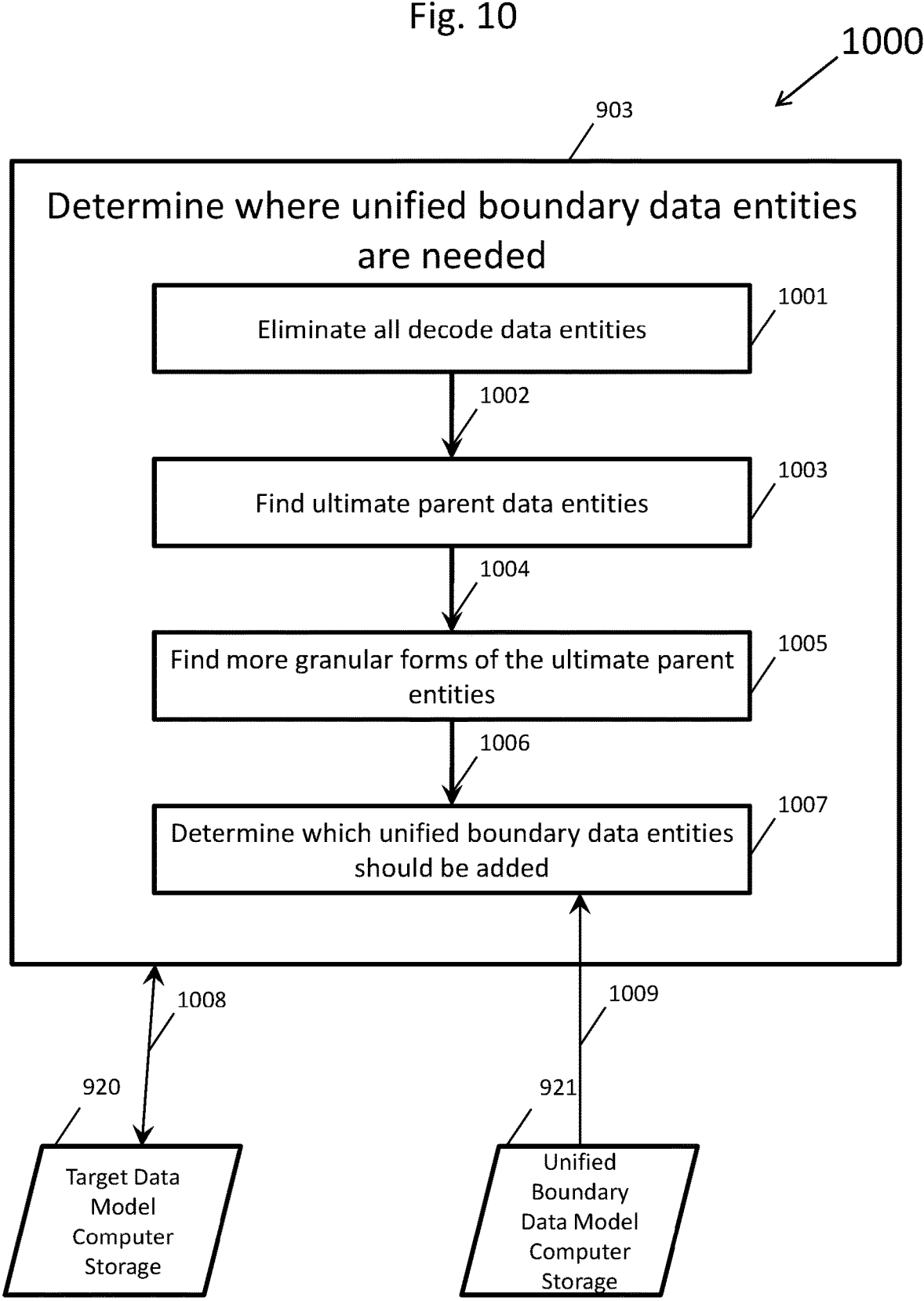
FIG. 10 shows a detailed flow chart, which details a subset of the master flow chart shown in FIG. 9, used to determine which unified boundary data entities may be added to an existing entity-relationship diagram, such as the entity-relationship diagram database shown in FIG. 5, to convert the existing entity-relationship diagram into a standardized unified entity-relationship diagram such as the entity-relationship diagram shown in FIG. 7.

The database conversion process, depicted in flow chart 900 shown in FIG. 9, begins at terminator 901 that is labeled "Start". Process flow line 902 indicates that program control initially begins execution at activity 903. Activity 903 is labeled "Determine where unified boundary data entities are needed". Within activity 903, the database to be converted is analyzed to find where unified boundary data entities would be useful. Activity 903 is performed with a CASE tool or data modeling tool running on the computer processor 4 shown in FIG. 1. Activity 903 is detailed in flow chart 1000 as shown in FIG. 10.

Once activity 903 is completed, the database conversion process continues as process control is transferred to decision 905 as indicated by process flow line 904. Decision 905 is used to decide if an appropriate unified boundary data entity has already been developed. Decision 905 is performed with a CASE tool or data modeling tool running on the computer processor 4 shown in FIG. 1. Each unified boundary data entity is developed to be part of a set of reusable data entities that may be utilized in any data model. If the appropriate unified boundary has been developed, process control is passed to activity 910 as indicated by process flow line 909. If an appropriate unified boundary has not been developed, process control is passed to activity 907 as indicated by process flow line 906. Activity 907 is executed to develop a new unified boundary data entity, which is developed with a CASE tool or data modeling tool running on the computer processor 4 shown in FIG. 1.

Figure 11:
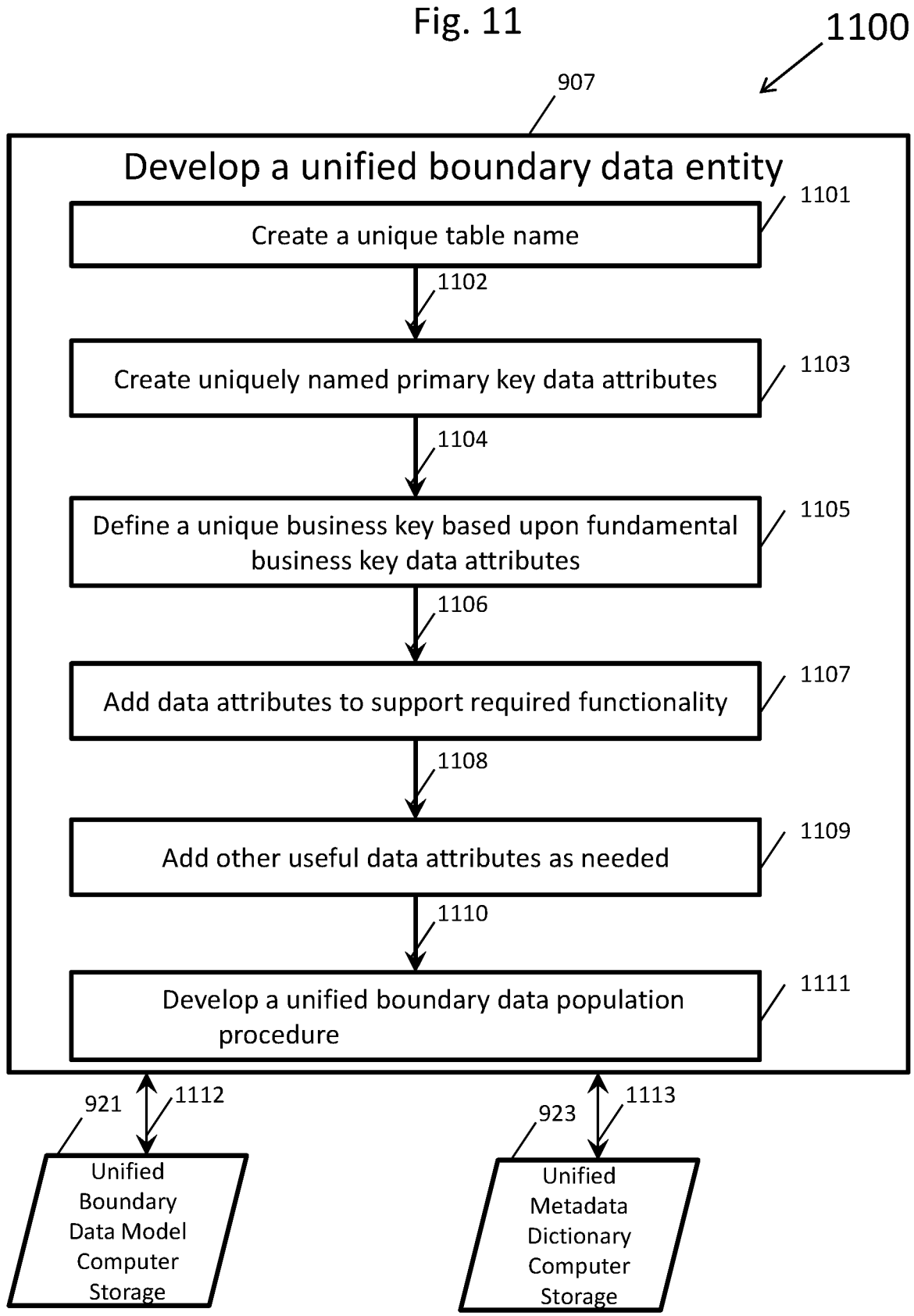
FIG. 11 shows a detailed flow chart, which details a subset of the master flow chart shown in FIG. 9, depicting the process of creating unified boundary data entities.

Activity 907 is detailed in flow chart 1100 which is shown in FIG. 11. Once Activity 907 is completed, process control is passed to activity 910 as indicated by process flow line 908 combined with process flow line 909.

Figure 13:
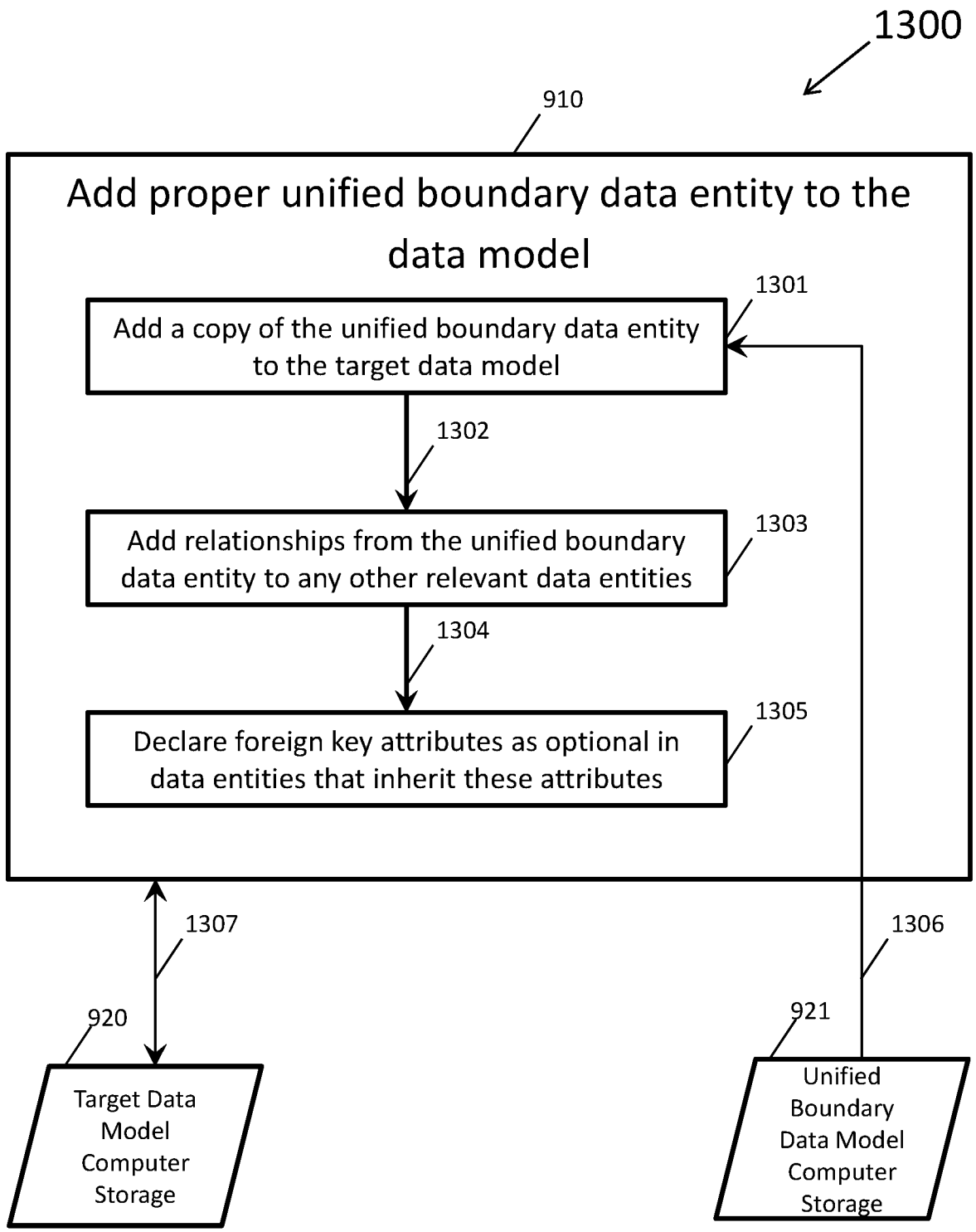
FIG. 13 shows a detailed flow chart, which details a subset of the master flow chart shown in FIG. 9, depicting the process of combining a unified boundary data entity with any existing entity-relationship diagram.

Activity 910 is the activity of adding a unified boundary data entity to the target data model that represents the design of the target database to be converted. Unified boundary data entities are added to the target data model with a CASE tool or data modeling tool running on the computer processor 4 shown in FIG. 1. Activity 910 is detailed in flow chart 1300 which is shown in FIG. 13. Once activity 910 is completed, process control is transferred to decision 912 as indicated by process flow line 911 in flow chart 900. Decision 912 is made based upon how many and which unified boundary data entities are to be added. In some cases, only one unified boundary data entity is sufficient. For other cases, more than one may be required. Please note that unified boundary data entities may be added to a data model at any time. Just as unified boundary database tables may be added to any database at any time. If the analysis of the data model to be converted has not been completed, process control is transferred back to decision 905 as indicated by process flow line 913 combined with process flow line 904 shown in flow chart 900 which is depicted in FIG. 9. However, when all the appropriate unified boundary data entities have been added to the target database, process control is passed to activity 915 as indicated by process flow line 914 as shown in flow chart 900 of FIG. 9.

Figure 15:
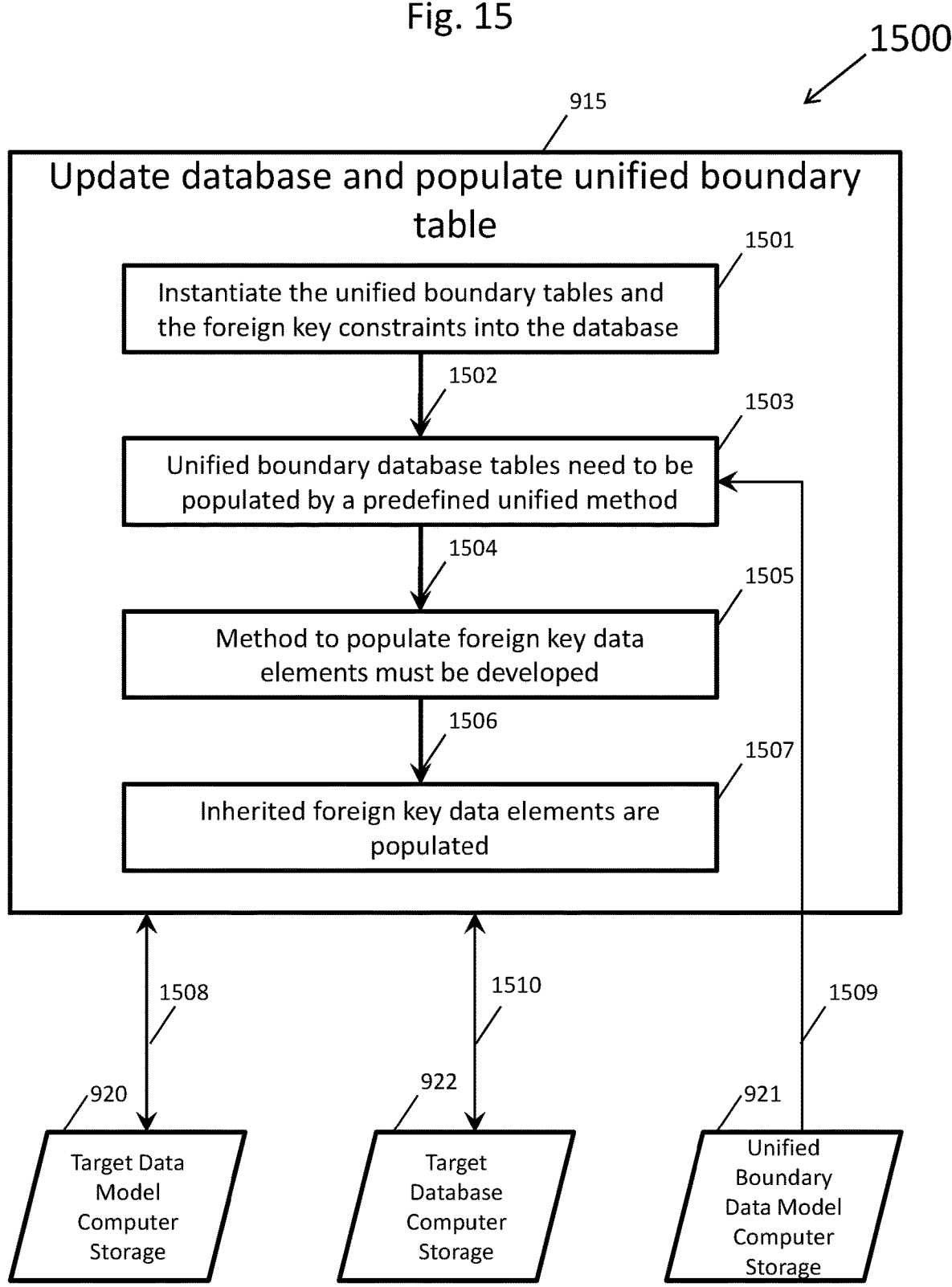
FIG. 15 shows a detailed flow chart, which details a subset of the master flow chart shown in FIG. 9, depicting the process of modifying an existing database containing populated database tables to include one or more populated unified boundary database tables.

Activity 915 is the beginning of modifying the existing database by instantiating the unified boundary database tables into the target database and populating these tables and updating any database tables that inherit foreign key database columns from the unified boundary database tables. Activity 915 is performed with database management system software running on the computer processor 4 shown in FIG. 1. Activity 915 of flow chart 900 is detailed in flow chart 1500 which is shown in FIG. 15. Once activity 915 has been completed, process control is passed to activity 917 as indicated by process flow line 916 as shown in flow chart 900 of FIG. 9.

Figure 19:
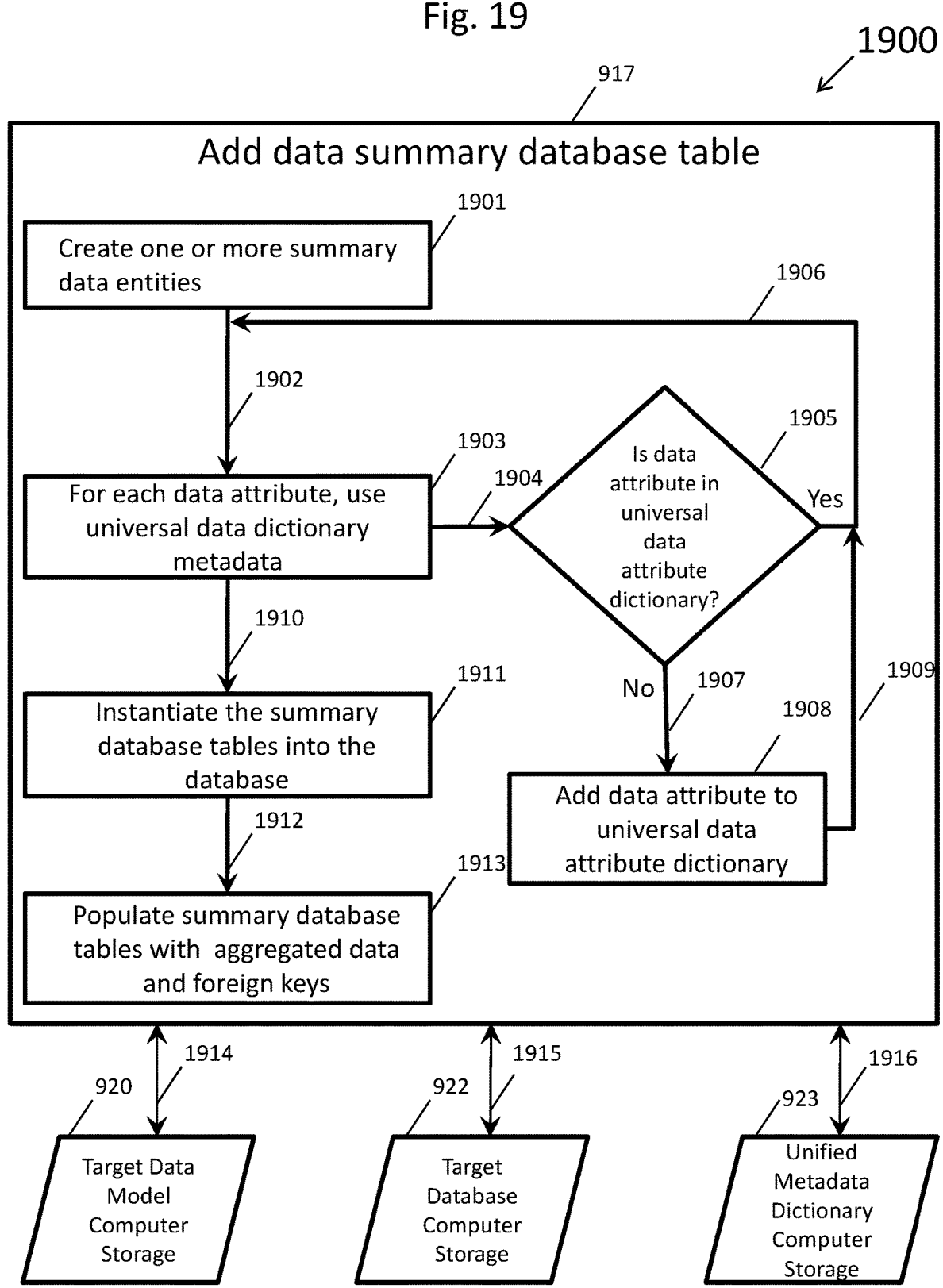
FIG. 19 shows a flow chart, which details a subset of the master flow chart shown in FIG. 9, depicting the addition of homogenous summary database tables to a database containing populated unified boundary database tables.

Activity 917 is used to add one or more aggregate or summary database tables, such as summary database table 815 of database 800 shown in FIG. 8, to the existing database, such as database 600 shown in FIG. 6. Detailed flow chart 1900 as shown in FIG. 19 details the process associated with activity 917 shown in flow chart 900 of FIG. 9. Any number of summary database tables may be added to the target database. In addition, these summary database tables may be added at any time after unified boundary database tables have been added. Activity 917 is performed with a CASE tool or data modeling tool and with database management system software running on the computer processor 4 shown in FIG. 1. Once the summary database tables have been added, as indicated by process flow line 918, process control is terminated after activity 917 of flow chart 900.

FIG. 10 shows detailed flow chart 1000 of the activity 903, which is depicted in flow chart 900 shown in FIG. 9. Flow chart 1000 is comprised of tasks 1001, 1003, 1005 and 1007, of computer data storage areas 920 and 921, of data flows 1008 and 1009, and of process flow lines 1002, 1004 and 1006. Activity 903 reads data from and writes data to computer data storage area 920 as indicated by data flow line 1008. Computer data storage area 920 may be a specific portion of computer memory 8 shown in FIG. 1 which contains the data models of the databases to be converted. In addition, task 1007 reads data from computer data storage area 921 as indicated by data flow line 1009. Computer data storage area 921 may be a specific portion of computer memory 8 shown in FIG. 1 which contains the data models of reusable unified boundary data entities and procedures for populating each database instantiated unified boundary database table.

Detailed flow chart 1000 represents an approach to determining where unified boundary database tables may be added to convert an independently heterogeneous database into a standardized homogeneous database. Any table in a target database may be linked to a unified boundary database table provided that database table contains some reference type data that may be directly related to the reference data of a unified boundary database table.

Figure 14A:
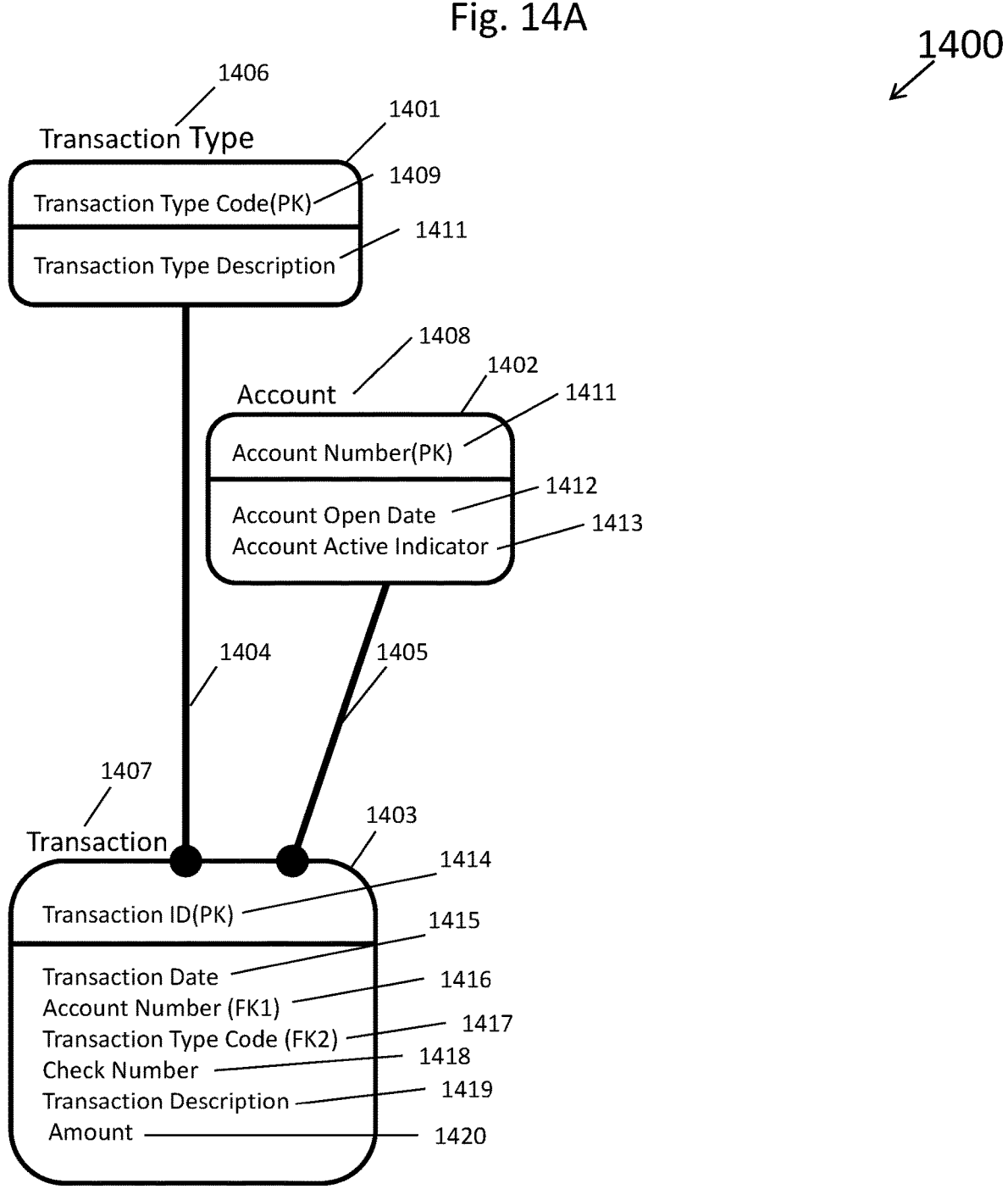
FIG. 14A depicts an entity-relationship diagram of an independently designed heterogeneous data model.

Task 1001, which is the first task in activity 903, is labeled "Eliminate all decode data entities". The target data model, the data model to be converted, such as the data model represented by ERD 500 shown in FIG. 5, is retrieved from computer data storage area 920. A decode type of data entity is very common in normalized data models. These decode data entities are most often composed from a code type of data attribute that is the primary key data attribute for the data entity and from a description type of data attribute. Data entity 1401 of ERD 1400 shown in FIG. 14A is an example of a decode type data entity. Decode type data entities are an artifact of a prior art data normalization process. The coded data attribute, such as data attribute 1417 of data entity 1403, is also represented in the decode type data entity 1401 as the code type data attribute 1409. The decode type data entities, such as data entity 1401 of an entity-relationship diagram 1400, each represent a consolidated list of codes and their descriptions. Since the code data attribute is redundant for our purposes, that is data attribute 1409 is redundant for data attribute 1417 in ERD 1400, all decode type data entities need to be removed from consideration in the target data model. For the purposes of this patent, a decode type data entity may not be a local boundary data entity. Once the decode type data entities have been eliminated from consideration, process control is passed from task 1001 to task 1003 as indicated by process flow line 1002 of detailed flow chart 1000 shown in FIG. 10.

Task 1003, which is labeled "Find ultimate parent data entities", is an effort to find the highest level reference data which is referred to as the ultimate parent data entities. When decode type data entities are not considered, ultimate parent data entities are data entities that do not inherit foreign key data attributes from any other data entities. ERD 500 shown in FIG. 5 contains no decode data entities. ERD 500 has data entity 501 as an ultimate parent data entity in that data model. Data entity 501 contributes data attributes in the form of foreign key data attributes to data entities 503 and 504. As such, data entities 503 and 504 are not ultimate parent data entities as they inherit data attributes from a different data entity which is data entity 501. Within ERD 500, the ultimate parent data entities are data entities 501, 502 and 505.

In the process of converting a prior art data model into a standardized homogeneous data model, the unified boundary data entities often displace the ultimate parent data entities and the unified boundary data entities themselves become the ultimate parent data entities. For example, data entity 501 of database 700 shown in FIG. 7 was an ultimate parent data entity before unified boundary data entity 701 was added. Once unified boundary data entity 701 was added, along with data entity relationship 706, data entity 501 is no longer an ultimate parent data entity having been displaced by unified boundary data entity 701.

Once the ultimate parent data entities have been located by the computer processor 4, process control is passed to task 1005 as indicated by process flow line 1004 of flow chart 1000 as shown in FIG. 10. Task 1005, which is labeled "Find more granular forms of the ultimate parent entities", is again a further attempt to search though computer memory 8 for local database boundary related reference data. Any data entity, which has a single data entity relationship that inherits foreign key data attributes from one and only one local database boundary data entity, may be a local database boundary data entity. For example, ERD 500 shown in FIG. 5 has three ultimate parent data entities which are data entities 501, 502 and 505. In ERD 500, data entities 503 and 504 are directly related to ultimate parent data entity 501. However, only data entity 503 has single data entity relationship 510 relating it to one and only one ultimate parent entity 501. Data entity 504 has data entity relationships from both ultimate parent data entity 501 and ultimate parent entity 505 and therefore is not a local database boundary data entity.

In ERD 500 shown in FIG. 5, the ultimate parent data entities have been established as data entities 501, 502 and 505. While data entity 503 is not an ultimate parent entity, it represents a more granular from of the reference data defined in ultimate parent data entity 501 and therefore data entity 503 is a local boundary data entity.

The local boundary data entities of ERD 500, shown in FIG. 5, have been determined to be comprised of ultimate parent data entities 501, 502 and 505 and data entity 503, where data entity 503 represents a more granular form of ultimate parent data entity 501. Once the data model containing ERD 500 is instantiated into a database, such as database 600 shown in FIG. 6, the data values stored in the local boundary database tables, such as database tables 601, 602, 605 and 603, will further define the unique database boundary. Once task 1005 of activity 903 of detailed flow chart 1000 shown in FIG. 10 has been completed, process flow line 1006 indicates that program control is passed to task 1007.

Task 1007 is used to determine which unified boundary data entities must be added to the target ERD. In order to implement a complete unified database boundary for a data model such as the data model that contains ERD 500 shown in FIG. 5, each local boundary data entity needs to be displaced by a unified boundary data entity. However, any addition of a unified boundary data entity to an ERD will provide some added functionality to the instantiated database. Therefore, the database designer, using the CASE tool software executing on a computer processor 4, must determine which of the local boundary data entities should be displaced. Once it is determined which local boundary data entities will be displaced, task 1007 of detailed flow chart 1000 has been completed. This also completes activity 903 as depicted in detailed flow chart 1000 as well as in flow chart 900 shown in FIG. 9.

FIG. 11 shows detailed flow chart 1100 that details the tasks associated with activity 907, which is also depicted in flow chart 900 shown in FIG. 9. Detailed flow chart 1100 shows tasks 1101, 1103, 1105, 1107, 1109 and 1111 that are a part of activity 907 which is labeled "Develop a unified boundary data entity". Program control within activity 907 is managed by process flow lines 1102, 1104, 1106, 1108 and 1110. Activity 907 both reads data from and writes data to computer data storage areas 921 and 923 via data flows 1112 and 1113 respectively. Computer data storage area 921 may be a specific portion of computer memory 8 shown in FIG. 1 which contains the data model of reusable unified boundary data entities and procedures for populating each database instantiated unified boundary database table. Computer data storage area 923 may be a specific portion of computer memory 8 shown in FIG. 1 which contains the reusable unified metadata dictionary.

The unified boundary data entities could, in theory, form a closed boundary that encapsulates all other data entities. The unified boundary data entities are independent in that they do not inherit foreign key data attributes from other data entities except:
 from another unified boundary data entity that represents a less granular representation of the same data
 from decode type data entities The unified boundary data entities are designed with the objective that they encompass the rest of the universe of data entities. In practice, however, a combination of unified boundary data entities and local database boundary data entities may be used to encapsulate the remainder of data entities in a data model. A limited set of unified boundary data entities provide any data model with the metadata commonality required to support data set integration across databases which is the major objective for this work.

Task 1101 of detailed flow chart 1100 shown in FIG. 11, is labeled "Create a unique table name". A data entity name is considered a metadata element. Unified boundary data entity metadata needs to be identical for each standardized homogeneous database however, within a single database, all database table names must be unique. Since the unified boundary database tables need to be incorporated into multiple independently designed databases, and since each database table name must be unique in each database, much consideration needs to be given to the unified boundary database table names. The unified boundary data entities are developed as part of an ERD that is contained within unified boundary data model that is stored and maintained in computer data storage area 921 via data flow 1112 as depicted in detailed flow chart 1100 shown in FIG. 11.

To begin task 1101, the CASE tool executing on computer processor 4 reads the unified boundary data model from computer storage area 921, which may be part of computer memory 8, and displays the unified boundary ERD on computer display device 6. The unified metadata dictionary is used to develop the unified boundary data entity name and once that name is developed, that metadata is added to unified metadata dictionary 923 via data flow 1113 using the computer processor 4 and the computer memory 8. Once the unified boundary data entity is uniquely named, program control is passed to task 1103 as indicated by process flow line 1102.

Task 1103 is labeled "Create uniquely named primary key data attributes". Data attribute names are considered metadata elements. Ideally, unified boundary data attributes need to be identical for each database to support the homogenous layer of these standardized homogeneous databases. Within a data entity, each data attribute needs to have a unique name. This includes any and all inherited foreign key data attributes. The names of the primary key data attributes for a unified boundary data entity is very important because these primary key data attribute names are inherited into many other data entities in multiple databases. Unified metadata dictionary 923 is used to develop the unified boundary data entity primary key data attribute names and once that name is developed, that metadata is added to unified metadata dictionary 923 via data flow 1113 using computer processor 4 and computer memory 8. Once the unified boundary data entity primary key has been defined, program control is passed to task 1105 as indicated by process flow line 1104.

Task 1105 of detailed flow chart 1100, as shown in FIG. 11, is labeled "Define a unique business key based upon fundamental business key data attributes". The fundamental business key data attributes used to form a unique business key of a unified boundary data entity are extremely critical, in at least one embodiment of the present invention, as they become the method for uniquely identifying each data record within the instantiated unified boundary database table. In order for a data entity to be considered a unified boundary data entity, the unique business key must be composed from one or more fundamental business key data attributes.

The purpose of the unified boundary data entity, in at least one embodiment, must be well developed before the unique business key may be developed. For example, if the unified boundary data entity is designed to represent locations on Earth, a combination of the fundamental business key data attributes of latitude and longitude would be a logical start for the business key. If the unified boundary data entity is designed to represent various periods of time, then the fundamental business data attributes of date and time would be considered. The scope of the unified boundary data entity, in at least one embodiment, must also be considered. The scope, as defined by the levels of data record granularity must be supported, in at least one embodiment. For example, if the unified boundary data entity is designed to represent time periods, the levels of granularity may be the calendar year, the calendar quarter, the calendar month, the calendar week and the calendar day. The unique business key selected for the unified boundary data entity, in at least one embodiment, must be functional for every level of data record granularity supported. Once the fundamental business key data attributes have been defined for the unified boundary data entity, unified metadata dictionary 923 will be updated, in at least one embodiment. Once task 1105 of detailed flow chart 1100 shown in FIG. 11 has been completed, program control is transferred to task 1107 as indicated by process flow line 1106.

Within task 1107, of detailed flow chart 1100 shown in FIG. 11, the functional requirements of the unified boundary data entity are determined. For example, most unified boundary data entities will support several levels of data granularity. Other unified boundary data entities need to support recording chronological changes in the unified boundary data records. Some unified boundary data entities, in at least one embodiment, will need to support the combination or merging of multiple data records into a single data record or need to support a single data record splitting into multiple data records all as a function of time. Each functional requirement will have a set of data attributes that need to be added to the unified boundary data entity to support that functional requirement. In some cases, some of these additional data attributes need to be added to the unique business key of the unified boundary data entity. For example, to support the recording of chronological changes in a unified boundary data entity, the data attributes of "effective date" and "expiration date", in at least one embodiment, must be added to the unified boundary data entity. The "effective date" data attributes now needs to be added to the unique business key data attributes to support the unique identification of a data record at a specific point in time. Once all of the data attributes needed to support required functionality have been added to the unified boundary data entity, unified metadata dictionary 923 is updated via data flow 1113. This completes task 1107 of detailed flow chart 1100 shown in FIG. 11, and process control will be passed from task 1107 to task 1109 as indicated by process flow line 1108.

In task 1109 of detailed flow chart 1100 shown in FIG. 11, additional data attributes may be added to the unified boundary data entity that represent additional useful data that is often used to further define the reference data record. Unified metadata dictionary 923 is used to define the metadata associated with any new data attributes. Once these additional data attributes have been added to the unified boundary data entity, unified metadata dictionary 923 is updated and the completed unified boundary data entity is stored in unified boundary data model 921. This completes task 1109 and program control is passed to task 1111 as indicated by process flow line 1110.

Task 1111 is used to develop a procedure to populate a specific unified boundary database table with a consistent set of unified boundary reference data records. Each specific unified boundary data entity will result in a single specific unified boundary database table in each standardized homogenous database where that specific unified boundary database table is required. Each of the specific unified boundary database tables, one of each in each standardized homogeneous database, will each require, in at least one embodiment, a consistent set of unified boundary reference data records. These consistent sets of unified boundary specific reference data records will ensure referential integrity between databases for each specific unified boundary database table. This inter-database referential integrity is required, in at least one embodiment, to support the formation of database bridges that form database access paths between databases.

Each procedure to populate a set of specific unified boundary database tables will be developed using prior art methods to populate database tables. Each procedure will include SQL scripts and may include other prior art components such as XML, program code, and written instructions. In any event, once the procedure for populating the unified boundary database tables has been completed, the procedure will be stored in unified boundary data model computer storage area 921. Task 1111 of detailed flow chart 1100 is complete as well as activity 907 of flow chart 900 shown in FIG. 9. Program control will now be transferred to activity 910 via process flow lines 908 and 909 as depicted in flow chart 900 of FIG. 9.

Figure 12:
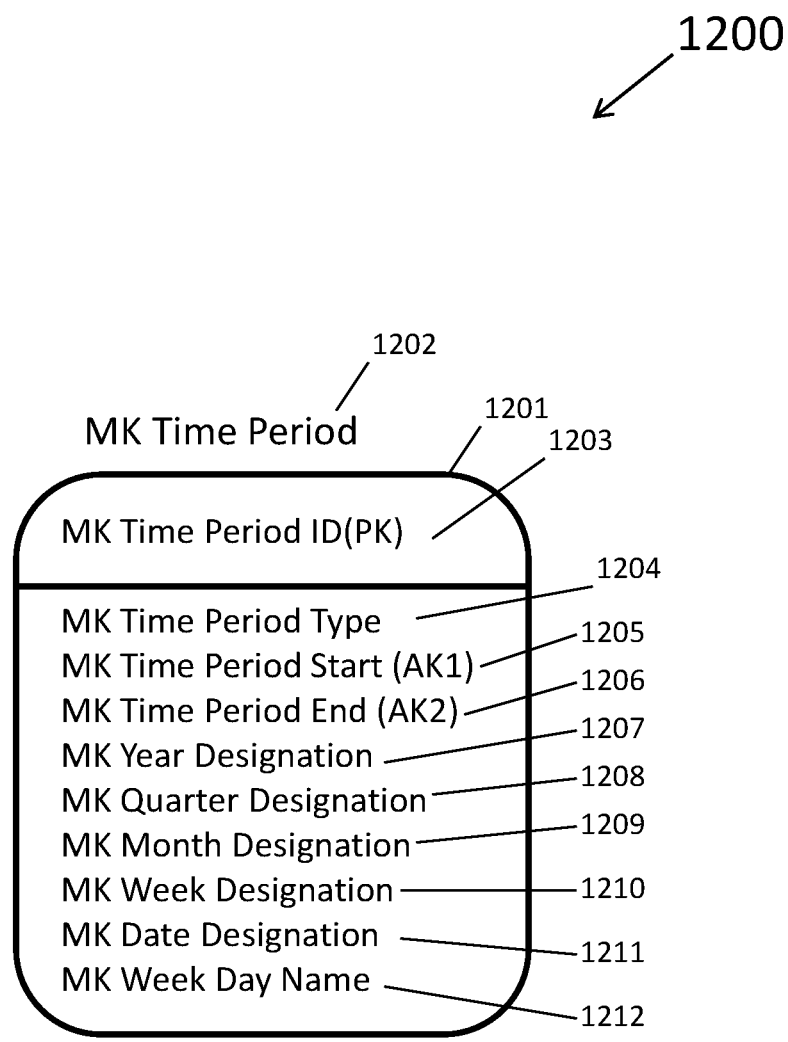
FIG. 12 depicts a single unified boundary data entity that is created in accord with the detailed flow chart shown in FIG. 11.

FIG. 12 shows ERD 1200 with unified boundary data entity 1201. The purpose of unified boundary data entity 1201 is to define various time periods associated with the Gregorian calendar such as the calendar years, the calendar months, and the calendar day. Unified boundary data entity 1201 was developed following the detailed flow chart 1100 as shown in FIG. 11. Task 1101 of detailed flow chart 1100 addresses the naming of unified boundary data entities. The unified boundary data entity name 1202 is "MK Time Period" as shown in ERD 1200 of FIG. 12. This data entity name is selected to be both informative as to the content of the data entity and unique within any set of data entities for any data model. The "Time Period" portion of unified boundary data entity name is somewhat unique and describes the data domain to the unified boundary data entity. The "MK" portion of the unified boundary data entity name 1202 was added merely to help assure uniqueness of the data entity name.

The unique naming of unified boundary data entities primary key attributes, such as primary key attribute 1203 of unified boundary data entity 1201 shown in FIG. 12, is addressed by task 1103 of activity 907 as depicted in flow chart 1100 of FIG. 11. Unified boundary data entity 1201 contains a single primary key data attribute 1203 as denoted by the "(PK)" designation. Data attribute name 1203 for this primary key data attribute is "MK Time Period ID". Since this primary key data attribute may be inherited into many other data entities via data entity relationship inheritance, the primary key data attribute names needs to be both informative and unique. The "MK Time Period" portion of data attribute name 1203 is indicative that this data attribute originated in the "MK Time Period" unified boundary data entity 1201. The "ID" portion of data attribute name 1203 is indicative that this data attribute is a surrogate primary key type of data attribute. The name of data attribute 1203 is therefore unique to the uniquely named unified boundary data entity 1201 and should be unique anyway this primary key data attribute would be inherited.

The design of the unique business key for a unified boundary data entity 1201 of ERD 1200 is addressed, by a computer processor, such as computer processor 4, as programmed by computer software stored in computer memory 8, in task 1105 of activity 907 as depicted in detailed flow chart 1100 for FIG. 11. For unified boundary data entity 1201 of ERD 1200, the unique business key is composed of fundamental business key data attributes 1205 and 1206 named "MK Time Period Start" and "MK Time Period End" respectively and designated "(AK1)" and "(AK2)" respectively. The "(AK)" designation is indicative of an alternate key. In this case the alternate key is composed of two business data attributes that combine to uniquely identify all data records that may be stored in the instantiated database table in computer memory 8.

These business key data attributes 1205 and 1206 are both based upon the fundamental measure of date and time. Time and date is globally defined and its unique identification is not dependent of any other data attributes. Time and date represents a singularly defined data standard and it may be resolved to a very low level of granularity down of subsecond measurement. Therefore, business data attributes 1205 and 1206 are fundamental business key data attributes. Each time period that is defined within data entity 1201 will be identified by its composite alternate key based upon the start of time period data value stored by data attribute 1205 and upon the end of time period data value stored by data attribute 1206. The fact that data entity 1201 has a unique business key based entirely upon fundamental data attributes insures that data entity 1201 is boundary data entity for any data model. In addition, the metadata for data entity 1201 is designed to be useable in multiple databases. Therefore, data entity 1201 is designed to be unified boundary data entity.

The alternate key, of unified boundary data entity 1201, enforces the uniqueness of the data records to be stored in its instantiated database table, in computer memory 8. In at least one embodiment, the computer processor 4 is programmed by computer software to not allow any two data records to contain equal start time period data values for data attribute 1205 as well as equal end time period data values for data attribute 1206. In fact, any two data records with the same data attribute 1205 data values as well as the same data attribute 1205 data values will represent exactly the same time period and are therefore redundant data records. The computer processor 4 is programmed to not allow redundant data records for the unified boundary database table, stored in computer memory 8, instantiated from data entity 1201, as the database management system, in the computer processor 4 is programmed by computer software to enforce the unique database table index instantiated to maintain the data integrity of the alternate key.

The computer processor 4 is programmed by computer software to add data attributes to unified boundary data entities that support required functionality as addressed in task 1107 of activity 907 as depicted in detailed flow chart 1100. Task 1107, as executed by the computer processor 4, addresses the addition of data attributes to support the required functionality of the unified boundary data entity. For ERD 1200, shown in FIG. 12, unified boundary data entity 1201 is designed to support multiple levels of granularity of the reference data. This support for multiple levels of data granularity will allow for adding summary data into the instantiated database, stored in the computer memory 8, and thus promotes data warehouse type data functionality within the instantiated database. The computer processor 4 is programmed by computer software to add data attribute 1204 with a data attribute name of "MK Time Period Type" to unified boundary data entity 1201 specifically to classify each level of granularity type within the unified boundary data entity. The computer processor 4 is programmed to add data attributes 1207, 1208, 1209, 1210 and 1211 to represent the calendar year, the calendar quarter, the calendar month, the calendar week and the calendar date levels of granularity respectively.

The computer processor 4 is programmed by computer software to add data attribute 1212, of ERD 1200 shown in FIG. 12, to unified boundary data entity 1201 via task 1109 of activity 907 as depicted in flow chart 1100 of FIG. 11. Task 1109, as executed by the computer processor 4, addresses the addition of other useful data attributes, such as data attribute 1212, to a unified boundary data entity, such as data entity 1201. Data attribute 1212 is named "MK Week Day Name" and will have data values of "Monday", "Tuesday", "Wednesday", "Thursday", "Friday", "Saturday", and "Sunday". The date level of granularity is already represented in unified boundary data entity 1201 with data attribute 1211. Data attribute 1212 is simply used as additional useful information about a calendar date. Once the additional data attributes have been added to the unified boundary data entity, in computer memory 8, by the computer processor 4, that unified boundary data entity is complete, in at least one embodiment. Finally, a reusable unified boundary data population procedure is developed in task 1111 of detailed flow chart 1100 shown in FIG. 11. This unified boundary data population procedure is specific for each unified boundary database table and includes software used to populate each of the specific unified boundary database tables with data records in each and every database into which that specific unified boundary database table is instantiated.

Unified boundary data entities and preparing unified boundary data entities in computer memory by use of a computer processor programmed by computer software, are not a part of prior art knowledge. First, unified boundary data entities are boundary data entities since they represent the outer most boundary of any data model. The concept of an outer boundary for any data model, stored in computer memory, is not prior art knowledge. Likewise, unified boundary database tables represent the outer most boundary of any database, stored in computer memory. The concept of an outer boundary of any database is not prior art knowledge. Secondly, unified boundary data entities are unified in that they are used as a set of standard metadata in boundary data entities for two or more independent heterogeneous data models, in computer memory. Converting multiple data models into standardized homogeneous data models by addition of unified boundary data entities, or implementing this through a computer processor programmed by computer software, is not a part of prior art knowledge. Likewise, unified boundary database tables are unified because they are to be used as a set of standard metadata and a set of standard data records used to convert multiple heterogeneous databases into standardized homogeneous databases. Again, the conversion of multiple databases into standardized homogeneous databases by adding unified boundary database tables is not a part of prior art knowledge.

FIG. 13 shows detailed flow chart 1300 of activity 910, which can be executed by the computer processor 4 programmed by computer software stored in computer memory 8. Activity 910 is also shown in master flow chart 900 shown in FIG. 9. Detailed flow chart 1300 shows a method which can be implemented by the computer processor 4 programmed by computer software stored in computer memory 8 to incorporate unified boundary data entities stored in the computer memory 8, such as unified boundary data entity 1201 depicted in ERD 1200 shown in FIG. 12, into a target data model in computer memory 8. This is a part of an overall process of converting a database in computer memory 8, such as database 600 shown in FIG. 6, into a standardized homogenous database such as database 800 in computer memory 8, shown in FIG. 8. Detailed flow chart 1300 shown in FIG. 13 depicts tasks 1301, 1303, and 1305, process flow lines 1302 and 1304, computer data storage areas 920 and 921, and data flow lines 1306 and 1307. Computer data storage area 920 may be a specific portion of computer memory 8 shown in FIG. 1 which contains the target data model that is to be converted into a standardized homogeneous data model. Computer data storage area 921 may be a specific portion of computer memory 8 shown in FIG. 1 which contains the data model of reusable unified boundary data entities and procedures for populating each database instantiated unified boundary database table.

In the first task, task 1301 of detailed flow chart 1300 shown in FIG. 13, the computer processor 4 is programmed by computer software to add an appropriate reusable unified boundary data entity to the target data model in computer memory 8. First the target data model is retrieved from computer data storage area 920 via data flow 1307. The unified boundary data entities to be added to the target data model are retrieved from computer data storage area 921 via data flow 1306. Depending upon the CASE tool used by the computer processor 4, and the data model functions supported by the CASE tool software application, the selected unified boundary data entity may be copied or may be inherited into the target data model. The result is that the target data model will now contain a copy of the unified boundary data entity in addition to the previously existing data entities. Once this task is completed, the computer processor 4, as represented by process flow line 1302 of detailed flow chart 1300, transfers program control from task 1301 to task 1303.

The computer processor 4 as programmed by computer software, executes task 1303, of detailed flow chart 1300 shown in FIG. 13, to create one or more data entity relationships in computer memory 8, such as data relationship 706 of ERD 700 shown in FIG. 7, originating from the unified boundary data entity, such as unified boundary data entity 701 shown in FIG. 7, and terminating in the appropriate target data entities, such as data entity 501 shown in FIG. 7. The unified boundary data entity will now become a boundary data entity for the target data model. By adding the proper data entity relationship from a unified boundary data entity to a target data entity, the target data entity now inherits foreign key data attributes from the unified boundary data entity. With the completion of task 1303, as indicated by process flow line 1304 of detailed flow chart 1300, the computer processor 4 is programmed by computer software to transfer process control to task 1305.

Task 1305 of detailed flow chart 1300 shown in FIG. 13 is the last task in activity 910. When the foreign key data attributes that are inherited from a unified boundary data entity, these foreign key data attributes need to be declared, by the computer processor 4 executing computer software, as optional data attributes. When these foreign key attributes are instantiated into a database populate with data records by the computer processor 4, the resulting database columns will need to be empty, in at least one embodiment, for each data record. This is only a consideration when unified boundary database tables and their associated foreign key constraints are added to an already populated database. Later, after the unified boundary database tables are populated and when the foreign key database columns are populated, the optionality (optional or mandatory) of the foreign key database columns may be adjusted by the computer processor 4 as programmed by computer software, depending upon the strategy used for maintaining the data values in these foreign key database columns. Once all of the foreign key data attributes inherited from unified boundary data entities have been declared as optional by the computer processor 4, the target data model, in at least one embodiment, needs to be updated by the computer processor 4 in the computer data storage area 920 via data flow 1307. This concludes task 1305 and activity 910 of detailed flow chart 1300. Process control, as executed by the computer processor 4, is now transferred from activity 910 to decision 912 via process flow line 911 of master flow chart 900 shown in FIG. 9.

FIG. 14A shows ERD 1400 contained within an independently designed heterogeneous data model, which would be stored in computer memory, such as computer memory 8. In ERD 1400, data entities 1401, 1402 and 1403 as well as data entity relationships 1404 and 1405 represent an ERD of a target independent heterogeneous data model to be converted into a standardized homogeneous data model, by the computer processor 4 as programmed by computer software and stored in computer memory 8. This target ERD 1400 is stored in its data model in computer data storage area 920 as seen in detailed flow chart 1300 shown in FIG. 13.

Data entity 1401 is an example of a decode type data entity, which has data entity name 1406 (Transaction Type). A decode type of data entity is a data entity that contains a code-type data attribute, such as data attribute 1409, that is declared as the primary key of the decode data entity. The declared primary key data attribute receives the (PK) notation and is displayed above the line, such as line 202a of ERD 200, within its data entity, such as data entity 202 shown in FIG. 2. In addition, a decode data entity contains a description-type data attribute, such as data attribute 1410, in computer memory 8, that has textual data values used to describe the code-type data attribute's data value, such as code-type data attribute 1409. For example data attribute 1409 could have a data value of "EFT" and data attribute 1410 could have a data value of "Electronic Funds Transfer" contained in the same data record. The purpose of data entity 1401, once instantiated into a database, is to store a list of data records where each data record contains a transaction type code data value and of a transaction code description data value.

Data entity 1402, which has data entity name 1408 (Account), is a data entity used to record data values associated with individual accounts. Data entity 1402 will provides a list of unique account numbers as reference data within the instantiated database. Data attribute 1411, which is used to store unique account numbers, is declared to be the primary key for data entity 1402. Data attribute 1412 represents the date that the account was opened while data attribute 1413 represents an indicator as to whether the account is active or inactive.

Data entity 1403, which has data entity name 1407 (Transaction), is a data entity used to record account transaction details. Primary key data attribute 1414, which is named Transaction ID, is the primary surrogate key for data entity 1403. Data attribute 1415 represents the date that the transaction data record was booked. Data attribute 1416, which is denoted as the first foreign key data attribute "(FK1)", represents the account number that is impacted by the transaction. Data attribute 1416 is inherited from data attribute 1411 of data entity 1403 via data entity relationship 1405. Data attribute 1417, which is denoted as the second foreign key data attribute "(FK2)", represents the transaction type of each transaction. Data attribute 1417 is inherited from data attribute 1409 of data entity 1401 via data entity relationship 1404. Data attribute 1418 is used to store a check number for transactions where checks are used. Data attribute 1418 would be considered an optional data attribute because a data value is not required to complete a transaction database table's data record. Data attribute 1419 is used to store a detailed description for the transaction and data attribute 1420 is used to store the US dollar amount of the transaction. The data model that contains ERD 1400 is merely for example purposes and is not intended to be a complete and properly normalized data model. This data model is also independently designed and heterogeneous as it has no deliberate metadata commonality to any other data model.

Figure 14B:
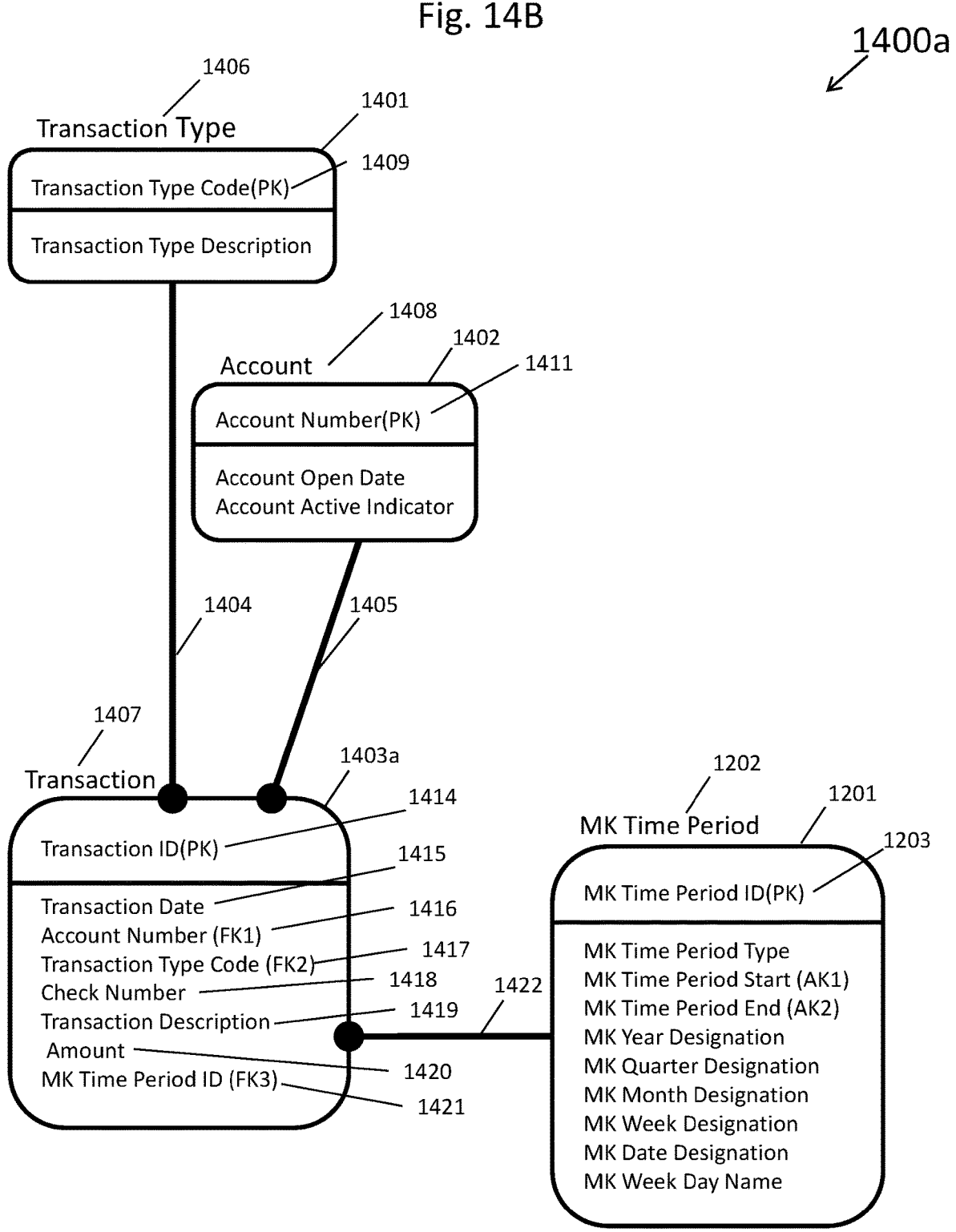
FIG. 14B depicts the same entity-relationship diagram as shown in FIG. 14A after a single unified boundary data entity has been added, such as for example by the computer processor of FIG. 1, as programmed by computer software stored in computer memory.

FIG. 14B depicts ERD 1400a, which shows the result of the computer processor 4 adding unified boundary data entity 1201 to ERD 1400 shown in FIG. 14A. Unified boundary data entity 1201 of ERD 1400a is the same unified boundary data entity as data entity 1201 of ERD 1200 shown in FIG. 12. Unified boundary data entity 1201 is a unified boundary data entity that was developed by the computer processor 4, as set forth in detailed flow chart 1100 shown in FIG. 11 and stored in computer data storage area 921 in computer memory 8, also shown in detailed flow chart 1100. The addition of unified boundary entity 1201 to ERD 1400 was achieved, by the computer processor 4 as programmed by computer software, using activity 910 shown in detailed flow chart 1300 as depicted in FIG. 13. Data entities 1401 and 1402 of ERD 1400a are the same data entities as data entities 1401 and 1402 respectively of ERD 1400, stored in computer memory 8, shown in FIG. 14A. Data entity 1403a of ERD 1400a began as data entity 1403 of ERD 1400. The computer processor 4 is programmed by computer software to use data entity relationship 1422 to cause foreign key data attribute 1421 to be inherited into data entity 1403a from primary key data attribute 1203 of unified boundary data entity 1201.

In ERD 1400 shown in FIG. 14A, data attribute 1415 of data entity 1403 represented a fundamental measure as it relates to the measure of time. The addition of unified boundary data entity 1201 provides additional master data functionality to the target data model design, stored in computer memory 8. Before the unified boundary data entity 1201 was added by the computer processor 4, the transactional data, such as data attribute 1420 of data entity 1403, was only represented at the day level of granularity in ERD 1400, shown in FIG. 14A. With the variety of granularity levels provided by unified boundary data entity 1201, now, the same transactional data may be aggregated into weekly amounts, monthly amounts, quarterly amounts or yearly amounts for example as depicted in ERD 1400a shown in FIG. 14B. This ability to aggregate data is characteristic of a data warehouse type of data model design. The unified database boundary is extremely important, in at least one embodiment of the present invention, for adding functionality to any target independent heterogeneous data model, stored in computer memory.

The addition of unified boundary data entity 1201 to ERD 1400a, by the computer processor 4 as programmed by computer software, shown in FIG. 14B converts an independently designed heterogeneous ERD into a standardized homogeneous ERD. While only a small portion of the ERD was modified, it was a very significant modification. All data attributes within the ERD are now directly or indirectly related to this unified boundary data entity, in computer memory 8. Therefore, every data entity in ERD 1400a, in at least one embodiment, is now defined, in computer memory 8, in a homogeneous manner relative to unified boundary data entity 1201. When ERDs from multiple data models contain unified boundary data entity 1201, the homogeneous boundary data entity provides a basis for the integration of metadata from these multiple data models.

FIG. 15 shows a detailed flow chart 1500 that details activity 915. Activity 915, shown in FIG. 15, is the same activity 915 in master flow chart 900 shown in FIG. 9. Activity 915 is the database instantiation of the standardized homogeneous data model, such as the data model that contains ERD 700 shown in FIG. 7. The result of activity 915, as executed by the computer processor 4 programmed by computer software stored in computer memory 8, will be the conversion of the existing target database, such as database 600 shown in FIG. 6, into a standardized homogeneous database such as database 800 shown in FIG. 8, in the computer memory 8.

Detailed flow chart 1500 depicts tasks 1501, 1503, 1505 and 1507 all as part of activity 915, to be executed by computer processor 4 as programmed by computer software stored in computer memory 8. Process control in detailed flow chart 1500 is depicted by process flow lines 1502, 1504 and 1506. Computer data storage areas 920, 921 and 922 along with their data flows 1508, 1509 and 1510 respectively are also depicted in detailed flow chart 1500. Computer data storage area 920 may be a specific portion of computer memory 8 shown in FIG. 1 which contains the target data model that is to be converted into a standardized homogeneous data model. Computer data storage area 921 may be a specific portion of computer memory 8 shown in FIG. 1 which contains the data model of reusable unified boundary data entities and procedures for populating each database instantiated unified boundary database table. Computer data storage area 922 may be a specific portion of computer memory 8 shown in FIG. 1 which contains the target database that is to be converted into a standardized homogeneous database.

Activity 915 of detailed flow chart 1500 begins with task 1501. Task 1501 is the database instantiation of a standardized homogeneous data model, such as the data model that contains ERD 700 shown in FIG. 7, into the existing target database such as database 600 shown in FIG. 6. The result of activity 915, as executed by the computer processor 4, as programmed by computer software, will be a standardized homogeneous database such as standardized homogeneous database 800 shown in FIG. 8. First, in task 1501, the target data model, which has now been updated to a standardized homogeneous data model, is retrieved from the computer data storage area 920, in computer memory 8, by the computer processor 4 as indicated by data flow 1508. Then, a Standard Query Language (SQL) data definition language script is computer generated by the data modeling tool stored in computer memory 8 and as implemented by the computer processor 4, from the target standardized homogeneous data model. This SQL script contains the instructions for the database management system (DBMS) software application running on the computer processor 4, to instantiate the unified boundary database tables in the computer memory 8 and to instantiate their foreign key constraints in the computer memory 8. Once this SQL script is executed by the computer processor 4, the existing target database will be converted into a standardized homogeneous database in the DBMS and stored in computer data storage area 922 in the computer memory 8 by the computer processor 4 as indicated by data flow 1510. The database instantiation of a converted data model's unified boundary data entities, such as unified boundary data entities 701 and 702 of ERD 700 shown in FIG. 7, results in unified boundary database tables in the computer memory 8, such as unified boundary database tables 801 and 802 respectively of database 800 shown in FIG. 8. The database instantiation of the data model's unified boundary data entity relationships, such as data entity relationships 706 and 708 of ERD 700, results in unified boundary database table related foreign key constraints such as foreign key constraint 806 and 808 respectively of database 800 shown in FIG. 8. Once the unified boundary data entities and their foreign key constraints are instantiated by the computer processor 4, task 1501 of detailed flow chart 1500 shown in FIG. 15 has been completed. Process control is then passed from task 1501 to task 1503, by the computer processor 4, as indicated by process flow line 1502 of detailed flow chart 1500.

The computer processor 4 is programmed by computer software to implement task 1503 to populate the database instantiated unified boundary database tables in the computer memory 8, with standardized homogeneous reference data records needed to enrich the reference data of the target database. The SQL script for populating each unified boundary database table, such as unified boundary database table 801 of database 800 shown in FIG. 8, with unified boundary data records, in at least one embodiment, should be programmed after the unified boundary data entity has been designed. Just as the unified boundary database table are reusable for any standardized homogeneous database; its associated SQL script for populating that reusable unified boundary database table is also reusable for any standardized homogeneous database.

The computer processor 4 is programmed by computer software to begin the task 1503 of detailed flow chart 1500, shown in FIG. 15, by retrieving the SQL script for populating the specific unified boundary database table from the computer data storage area 921, in computer memory 8, as indicated by data flow line 1509. The unified procedure for populating the unified boundary database table is executed by the computer processor 4 as programmed by computer software stored in the computer memory 8, and the unified boundary database table will now be completely populated, in at least one embodiment. The unified boundary data records are stored in their unified boundary database tables within computer data storage area 922, in computer memory 8. by the computer processor 4 as indicated by data flow 1510 as shown in FIG. 15. The computer processor 4 is programmed to implement task 1503 for each of the unified boundary database tables until each one is completely populated in computer memory 8. Once all of the unified boundary database tables have been completely populated with data records, task 1503 is completed. Process control for computer processor 4 is then passed from task 1503 to task 1505 as indicated by process flow line 1504 of detailed flow chart 1500 shown in FIG. 15.

Task 1505 of detailed flow chart 1500, shown in FIG. 15, involves the development of a specialized SQL procedure, programmed on a computer processor, such as computer processor 4, to populate foreign key database columns in the computer memory 8, that have been added to existing database tables by the instantiation of unified boundary database tables and their foreign key constraints. Each specialized SQL procedure is unique for each target database table since the target database tables themselves are each heterogeneous and are thus unique. Once the specialized SQL procedure to populate the foreign key data database columns has been created by the computer processor 4 as programmed by computer software, the method may be stored in computer data storage area 920 of computer memory 8 as indicated by data flow 1508 of detailed flow chart 1500 shown in FIG. 15. Once all the specialized SQL procedures have been created by the computer processor 4 and stored in computer memory 8, task 1505 is complete and process control is passed from task 1505 to task 1507 as indicated by process flow line 1506.

The computer processor 4 implements task 1507 to populate the inherited foreign key data attributes with the proper data values to complete the foreign key relation between the unified boundary database tables and the remainder of the target database tables, in computer memory 8. The specific SQL procedures developed by the computer processor 4 and stored in computer memory 8 in task 1505 are retrieved from computer data storage area 920 by the computer processor 4 as indicated by data flow 1508 of detailed flow chart 1500 shown in FIG. 15. The specific SQL procedure, once executed by the computer processor 4, will populate the foreign key database columns in computer data storage area 922, in computer memory 8, as indicated by data flow 1510 shown in FIG. 15. Once all of the foreign key database columns have been populated by the computer processor 4, task 1507 is complete as is activity 915 of detailed flow chart 1500 shown in FIG. 15.

Figure 16:
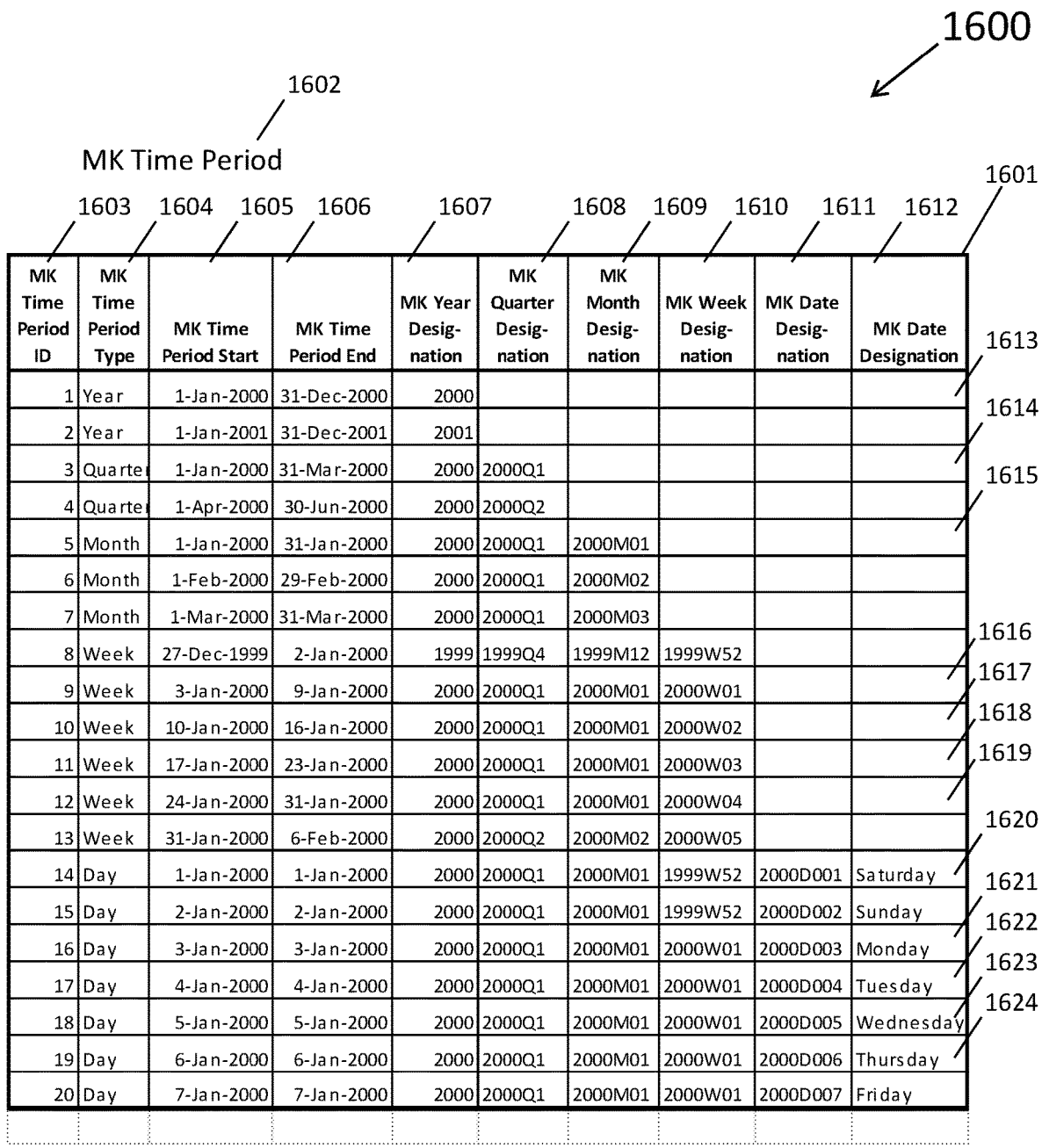
FIG. 16 depicts a populated unified boundary database table that was instantiated from the entity-relationship diagram shown in FIG. 12.

FIG. 16 represents a database 1600, that can be stored in computer memory 8, and that contains a populated unified boundary database table 1601. This populated unified boundary database table 1601 represents the database instantiation of unified boundary data entity 1201 of ERD 1200 as shown in FIG. 12. Database table name 1602, shown in FIG. 16, was instantiated, by the computer processor 4 as programmed by computer software, from data entity name 1202 as shown in FIG. 12. The unified boundary database columns 1603, 1604, 1605, 1606, 1607, 1608, 1609, 1610, 1611 and 1612 are instantiated by the computer processor 4 into the database table 1601 based upon unified boundary data attributes 1203, 1204, 1205, 1206, 1207, 1208, 1209, 1210, 1211 and 1212 respectively of data entity 1201 depicted in ERD 1200 shown in FIG. 12.

When first instantiated into a database, unified boundary database tables, such as unified boundary database table 1601, are empty in that the database table contains no data records. This database instantiation of empty unified boundary database table 1601 in to a database is performed by the computer processor 4 with task 1501 of detailed flow chart 1500 shown in FIG. 15. Unified boundary database table 1601 is populated in computer memory 8 as detailed in task 1503 of detailed flow chart 1500. Specifically, a predefined SQL script as stored in computer memory 8 is normally employed and/or executed by the computer processor 4 to populate unified boundary database table 1601 in the computer memory 8 within any standardized homogeneous database.

Unified boundary database table 1601 has database column 1603 as the primary key for this database table. As such, a unique index is instantiated into the database that references database column 1603 and that enforces the uniqueness of the data values in that database column. In other words, no two data records in database table 1601 will be allowed to have the same data value in database column 1603. Additionally, a unique database index that references the alternate key database columns 1605 and 1606 is also instantiated into the database. This unique index is a composite index that enforces the uniqueness of the combined data values from database columns 1605 and 1606. Therefore, in at least one embodiment, no two data records in database table 1601 may have the same pair of data values in columns 1605 and 1606. Database columns 1605 and 1606 are instantiated by the computer processor 4 from fundamental business key data attributes. As such, database columns 1605 and 1606 ensure that this database table is a boundary database table that is extremely important, in at least one embodiment, as a common basis used to define the significance of much of the data in the database.

The data records shown in database table 1601 of FIG. 16, such as data records 1613, 1614, 1615, 1616, 1617, 1618, 1619, 1620, 1621, 1622, 1623 and 1624, are merely a sample of the entire data set. Data record 1613 is an example of a data record that represents a single year in time, specifically the year 2000. Data record 1614 is an example of a data record that represents a single calendar quarter of year 2000, specifically the first calendar quarter of year 2000. Data record 1615 is an example of a data record that represents a single calendar month of year 2000, specifically the first month of year 2000 or January 2000. Data record 1616 is an example of a data record that represents a single calendar week of year 2000, specifically the first week of year 2000. Data record 1620 is an example of a data record that represents a single calendar date of year 2000, specifically the first day of year 2000 or Saturday Jan. 1, 2000.

Unified boundary database table 1601 of database 1600, shown in FIG. 16, was instantiated by the computer processor 4 as programmed by computer software from unified boundary data entity 1201 shown in FIG. 12. Unified boundary data entity 1201 was designed to support various levels of data granularity during task 1107 of detailed flow chart 1100 shown in FIG. 11. Data attribute 1204 of data entity 1201 shown in FIG. 12 was added by the computer processor 4 to identify the level of data granularity of the data record. Data attribute 1204 was instantiated into unified boundary database table 1601 as column 1604 as depicted in database 1600 shown in FIG. 16. The domain of data values for database table 1601 column 1604 are "Year", "Quarter", "Month", "Week", and "Day" as shown, for example, in data records 1613, 1614, 1615, 1616 and 1620 respectively. Since this unified boundary database table supports multiple levels of reference data granularity, this database table may be used as a dimensional table in a data warehouse type application. Data that is stored in a database at the "Month" level of granularity may be aggregated to a higher level of granularity such as to the "Quarter" level of granularity or to the "Year" level of granularity. For example, data record 1615 of database table 1601 is a "Month" level of granularity data record as indicated by data value of database column 1604 for data record 1615. However, database column 1608 of data record 1615 with a data value of "2000Q1", indicates that data record 1615 is also assigned to the first quarter of the year 2000. Therefore, any database table data records with a foreign key constraint that references data record 1615 would be associated to the first month of the year 2000 as well as to the first quarter of year 2000. Likewise, data that is stored at the "Month" level of granularity may be allocated to a lower level of granularity such as to a "Week" or to a "Day". For example, to allocate target data from the month level of granularity to the week level of granularity, any data record in database table 1601 that has a data value equal to "2000M01" in database column 1609, and a data value of "Week" in database column 1604, such as data records 1616, 1617, 1618 and 1619, would be allocated a prorated portion of the target data.

Unified boundary database table 1601 is a database table that would be added to many databases and the combination of its metadata and of its data records represent, in part, the standardized homogeneous layer of each standardized homogeneous database. Any database that contains unified boundary database table 1601 now has a database bridge that allows combining the network of database access paths from one database to another based upon the common unified boundary database tables.

FIG. 17A depicts database 1700 contains database table 1701 which is the database instantiation of data entity 1403 shown in ERD 1400 of FIG. 14A. Database table name 1702 show in FIG. 17A is the result of the computer processor 4 instantiating data entity name 1407 which is shown in FIG. 14A. Database columns 1703, 1704, 1705, 1706, 1707, 1708 and 1709 are the result of database instantiation by the computer processor 4 of data attributes 1414, 1415, 1416, 1417, 1418, 1419 and 1420 respectively of data entity 1403 of data model 1400 as shown in FIG. 14A. In addition, database table 1701 is populated by the computer processor 4 as programmed by computer software with several transaction data records such as data records 1711, 1712, 1713, and 1714.

The data model that contains ERD 1400, shown in FIG. 14A, has been converted into a standardized homogeneous data model that contains modified ERD 1400a as shown in FIG. 14B. In the process of converting data entity 1403 of ERD 1400 into modified data entity 1403a of ERD 1400a, foreign key data attribute 1421 has been added to data entity 1403a by the computer processor 4 as programmed by computer software. Foreign key data attribute 1421 results from data entity relationship 1422 which was added to relate unified boundary data entity 1201 to data entity 1403a.

Figure 17B:
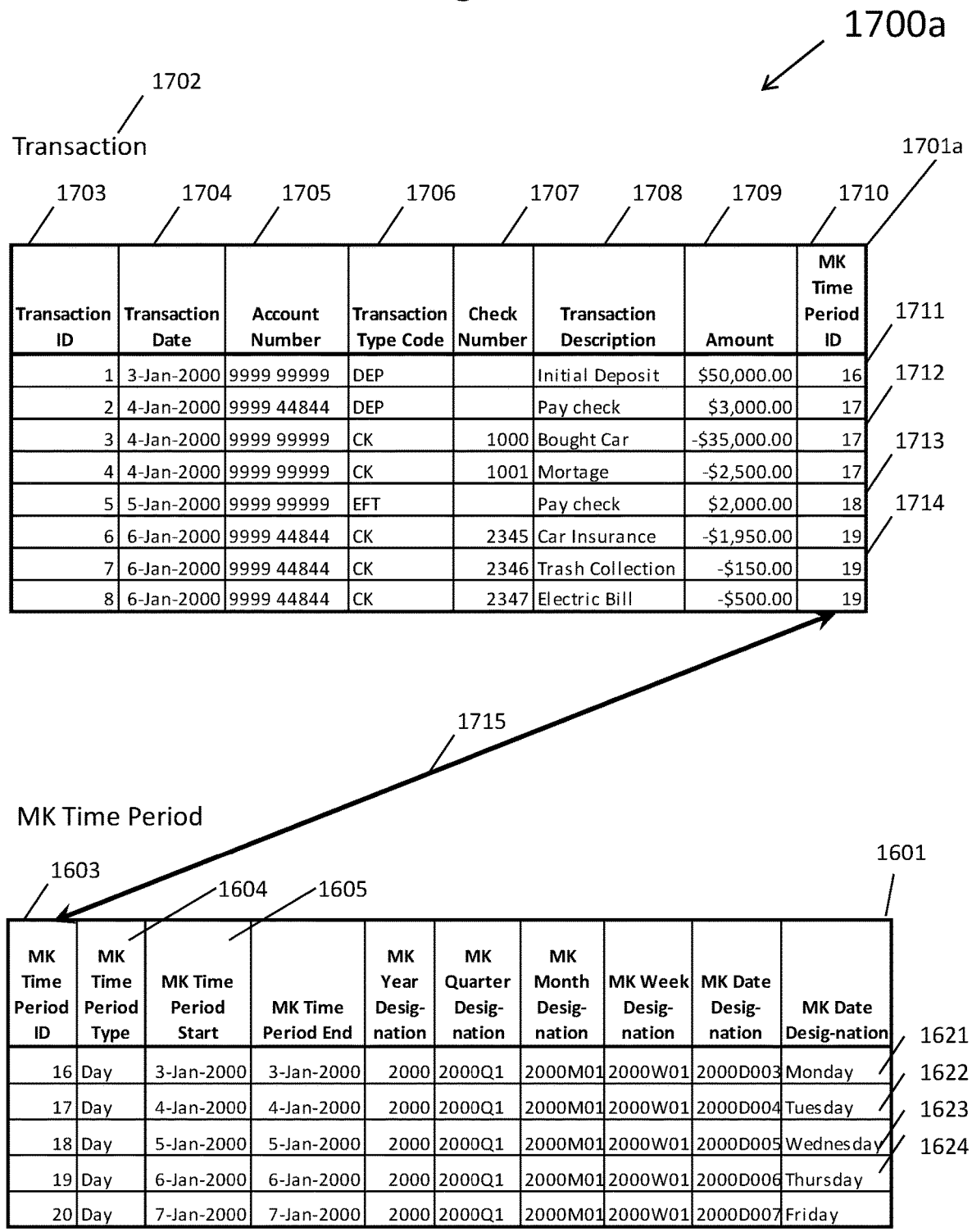
FIG. 17B depicts the populated database table from FIG. 17A after a unified boundary database table has been added along with a foreign key constraint that relates the two database tables.

FIG. 17B depicts database 1700a that contains database table 1701a, unified boundary database table 1601 and foreign key constraint 1715. Database table 1701a was modified from database instantiated of data entity 1403a shown in data model 1400a of FIG. 14B. Database columns 1703, 1704, 1705, 1706, 1707, 1708, and 1709 of database table 1701a are the same database columns as shown in database table 1701 of database 1700 as shown in FIG. 17A. The modification to table 1701 of database 1700 was the addition of database column 1710 that is shown in database table 1701a. The additional database column 1710 was database instantiated by the computer processor 4 as programmed by computer software from data entity 1403a of ERD 1400a shown in FIG. 14B. In database 1700a, database table 1701*a* is populated by the computer processor 4 with data records such as data records 1711, 1712, 1713, and 1714.

Database table 1601 for database 1700*a*, shown in FIG. 17B, is a copy of database table 1601 from database 1600 as shown in FIG. 16. However, in database table 1601 of database 1700*a*, only the pertinent subset of data records is displayed.

Foreign key constraint 1715 of database 1600*a* shown in FIG. 17B, declares that database column 1710 of database table 1701*a* references database column 1603 of database table 1601. Upon creation of a data record in dependent database table 1701*a* in computer memory 8, the data value of database column 1710 must exist in database column 1603 of parent database table 1601, in computer memory 8. Data records 1711, 1712, 1713 and 1714 have data values of "16", "17", "18" and "19" respectively in database column 1710. These data values of "16", "17", "18" and "19" do indeed exist in database column 1603 of database table 1601 in data records 1621, 1622, 1623 and 1624 respectively. If an attempt is made to combine data records from database table 1601 with data records from database table 1701*a*, the database access path for combining these two different data record sets is maintained by the use of foreign key constraint 1715 by the computer processor 4 as programmed by computer software. For example, data record 1711 of database table 1701*a* which has a data value of "16" in database column 1710 would be combined, by the computer processor 4, with data record 1621 from database table 1601 which also has the data value of "16" in database column 1603.

Before activity 915 of detailed flow chart 1500 shown in FIG. 15 has been performed by the computer processor 4, database table 1701 existed as shown in database 1700 of FIG. 17A. Once activity 915 of detailed flow chart 1500 has been completed by the computer processor 4, the result is shown in database 1700*a* of FIG. 17B. Task 1501, of detailed flow chart 1500, is used, by the computer processor 4 as programmed by computer software, to add database table 1601, add database column 1710 to database table 1701 and add foreign key constraint 1715 to database 1700. Task 1503 of detailed flow chart 1500 was used to populate unified boundary database table 1601 with data records such as data record 1621. Once unified boundary database table 1601 is populated, the computer processor 4 performs tasks 1505 and 1507 to populate the data values of database column 1710 in database table 1701*a* of database 1700*a*. The result of converting database 1700 in part to a standardized homogeneous database is shown in database 1700*a* of FIG. 17B.

By adding the unified boundary database table to an existing database, additional database functionality is provided. First, the unified boundary database table enriches the existing reference data as it normally adds more information than what originally existed. Secondly, the database's unique local boundary is displaced by a standard homogeneous boundary that is intended to be permanent and may not be displaced. Thirdly, the unified boundary database table provides a basis of the homogeneous database layer. Additionally, the unified boundary database table adds data warehouse functionality to the database.

Figure 18:
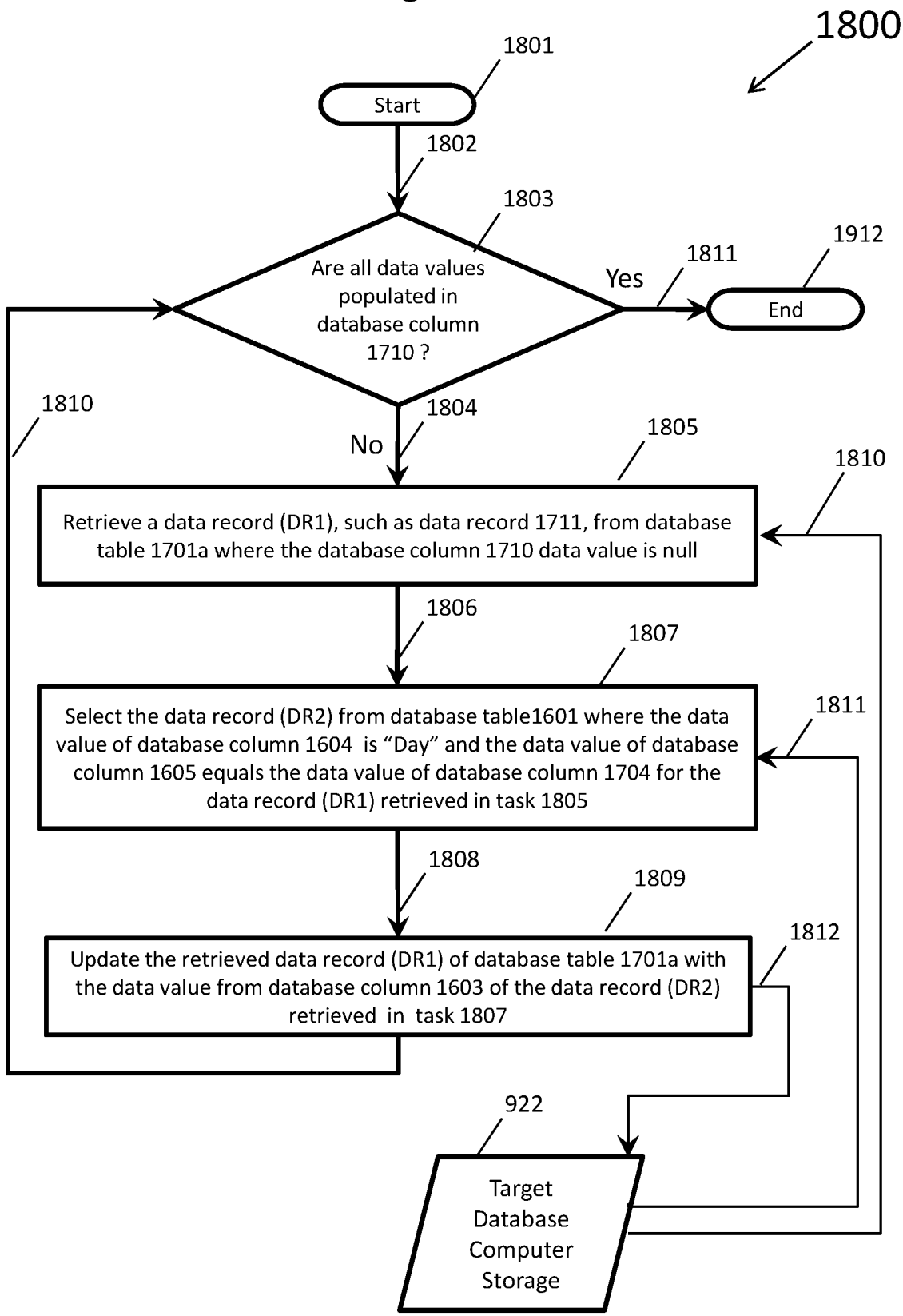
FIG. 18 depicts a flow chart of a procedure for populating foreign key database columns inherited from a unified boundary database table.

FIG. 18 depicts flow chart 1800 that details a procedure to be executed by the computer processor 4 as programmed by computer software for populating foreign key database column 1710 of database table 1701*a* shown in FIG. 17B. This procedure for populating foreign key database column 1710 is in response to task 1505 of detailed flow chart 1500 shown in FIG. 15. This foreign key population flow chart is comprised of decision 1803, of tasks 1805, 1807 and 1809, of process flow lines 1802, 1804, 1806, 1808, 1810, and 1811, of computer data storage area 922, of data flow lines 1810, 1811 and 1812, and of flow chart terminators 1801 and 1812. Computer data storage area 922 may be a specific portion of computer memory 8 shown in FIG. 1 which contains the target database that is to be converted into a standardized homogeneous database.

When database table 1701*a* is first database instantiated by computer processor 4 as programmed by computer software stored in computer memory 8, all data records will have a null value in database column 1710. Decision 1803 is used by computer processor 4 to determine when all data records of database table 1701*a* have database column 1710 populated. Task 1805 is use to retrieve a single data record from database table 1701*a* where the data value of database column 1710 is null. Task 1807 is used to find the single data record from database table 1601 where the data value of database column 1604 is "Day", the day level of granularity, and where the data value of database column 1605 is equal to the data value of database column 1704 for the data record retrieved from database table 1701*a*. For example, data record 1711 of database table 1701*a* has a data value of "3 Jan. 2000" in database column 1704. In database table 1601, data record 1621 is the single data record where the data value of database column 1605 is also "3 Jan. 2000" and the data value of database column 1604 is "Day". The computer processor 4 is programmed by computer software to execute task 1809 to update database column 1710 of database table 1701*a*. Once the single data record in database table 1601 has been located, such as data record 1621, the data value in database column 1603 ("16") of database table 1601 is inserted into data record 1711 database column 1710 ("16") of database table 1701*a*. The updated data record 1711 is then stored in target database 922 and process control is passed to decision 1803 until all data records have been processed.

Once the foreign key database columns that relate to the unified boundary database table are populated, the database access paths, such as bidirectional database access path 1715 of database 1700*a*, from the unified boundary database tables to the rest of the database tables are established. All the data in the database may ultimately be stated in terms of the fundamental business key attributes provided by the unified boundary database tables.

FIG. 19 shows detailed flow chart 1900 that details activity 917 of master flow chart 900 shown in FIG. 9. The computer processor 4 as programmed by computer software stored in computer memory 8, implements activity 917, to achieve the database instantiation of summary database tables in computer memory 8, such as summary database table 805 shown in FIG. 8. Detailed flow chart 1900 of activity 917 shown in FIG. 19 is composed of tasks 1901, 1903, 1908, 1911 and 1913, and of decision 1905 which are implemented by computer processor 4, and of computer data storage areas 920, 922 and 923 of computer memory 8, and of data flows 1914, 1915 and 1916 and of process flow lines 1902, 1904, 1906, 1907, 1909, 1910 and 1912, implemented by the computer processor 4. Computer data storage area 920 may be a specific portion of computer memory 8 shown in FIG. 1 which contains the data models of the databases to be converted. Computer data storage area 922 may be a specific portion of computer memory 8 shown in FIG. 1 which contains the target database that is to be converted into a standardized homogeneous database. Computer data storage area 923 may be a specific portion of computer memory 8 shown in FIG. 1 which contains the reusable unified metadata dictionary.

The computer processor 4 is programmed to implement task 1901 of detailed flow chart 1900 to retrieve the standardized homogeneous data model from computer data storage area 920 as shown by data flow 1914. This data model will contain a standardized homogeneous ERD, such as ERD 700 shown in FIG. 7. One or more summary data entities, such as summary data entity 705 of ERD 700, will be added to the ERD, in the computer memory 8. Data entity relationships, such as data entity relationships 707, 709, 711 and 713 of ERD 700, are added to the summary data entities to form direct relations between the summary data entities and the appropriate unified boundary data entities such as unified boundary data entities 701, 702, 703 and 704 of ERD 700. In at least one embodiment, the summary data entity name needs to conform to the naming standard defined in the unified metadata dictionary maintained in computer data storage area 923 which is retrieved by the computer processor 4 as detailed by data flow 1916. Once the summary data entity has been added to the standardized homogeneous ERD along with the required data entity relationships, task 1901 is complete. Process control is then passed from task 1901 to task 1903 via process flow line 1902.

The computer processor 4 as programmed by computer software stored in computer memory 8, implements task 1903, of detailed flow chart 1900, to add data attributes to the summary data entity in computer memory 8, such as summary data entity 705 depicted in ERD 700 shown in FIG. 7. In at least one embodiment, each data attribute added to the summary data entity needs to conform to the metadata standard defined and maintained in the unified metadata dictionary maintained in computer data storage area 923, in computer memory 8, as shown in detailed flow chart 1900. In order to provide a complete standardized homogeneous database layer across multiple databases, the unified metadata dictionary is designed to be reusable for these multiple databases. For each data attribute added to the summary data entity in task 1903, process control is passed to decision 1905 as indicated by process flow line 1904. The computer processor 4 determines if unified metadata dictionary 923 contains metadata for the added data attribute at decision 1905. If the metadata for the added data attribute is contained in unified metadata dictionary 923, that metadata is used, by the computer processor 4 when adding the data attribute to the summary data entity. Once the data attribute has been completely annotated, process control is returned to task 1903 via process flow lines 1906 and 1902 to add the remaining data attributes. If the data attribute to be added to summary data entity is not found by the computer processor 4, in unified metadata dictionary 923, then process control is passed to task 1908 as indicated by process flow line 1907.

In task 1908 of detailed flow chart 1900, the complete metadata for the new data attribute is entered into the computer processor 4, then, stored into unified metadata dictionary 923, in computer memory 8 as indicated by data flow 1916. Once the metadata entry is saved and the data attribute is added to the summary data entity, process control is passed back to task 1903 as indicated by process flow lines 1909, 1906 and 1902. Once all of the data attributes have been added to the summary data entity, the computer processor 4 saves the standardized homogeneous data model in computer data storage area 920 in computer memory 8 via data flow 1914. This completes task 1903 and process control, as executed by computer processor 4 as programmed by computer software, is then passed to task 1911 as indicated by process flow line 1910.

In task 1911 of detailed flow chart 1900, the computer processor 4 is used to retrieve the completed standardized homogeneous data model from computer data storage area 920 in computer memory 8 as indicated by data flow 1914. From this data model, summary database tables and their foreign key constraints are database instantiated by the computer processor 4 into the standardized homogeneous database, such as database 800 shown in FIG. 8, and are stored in computer data storage area 922, in computer memory 8, as indicated by data flow 1915. The instantiated summary database table will not contain any data records at this time. Once the database objects have been instantiated from the standardized homogeneous data model into the standardized homogeneous database, process control as implemented by computer processor 4, will be passed to task 1913 as indicated by process flow line 1912.

In task 1913, the summary database tables, such as summary database table 805 of database 800 shown in FIG. 8, are populated in computer memory 8, by the computer processor 4 as programmed by computer software in the computer memory 8, by aggregating the data values already contained within the database in other database tables, such as database tables 606 and 608 also from database 800. The computer software used to populate each summary table will be unique as the source database tables, such as database tables 606 and 608, contain heterogeneous metadata. This completes activity 917 as seen in the detailed flow chart 1900 of FIG. 19.

Figure 20:
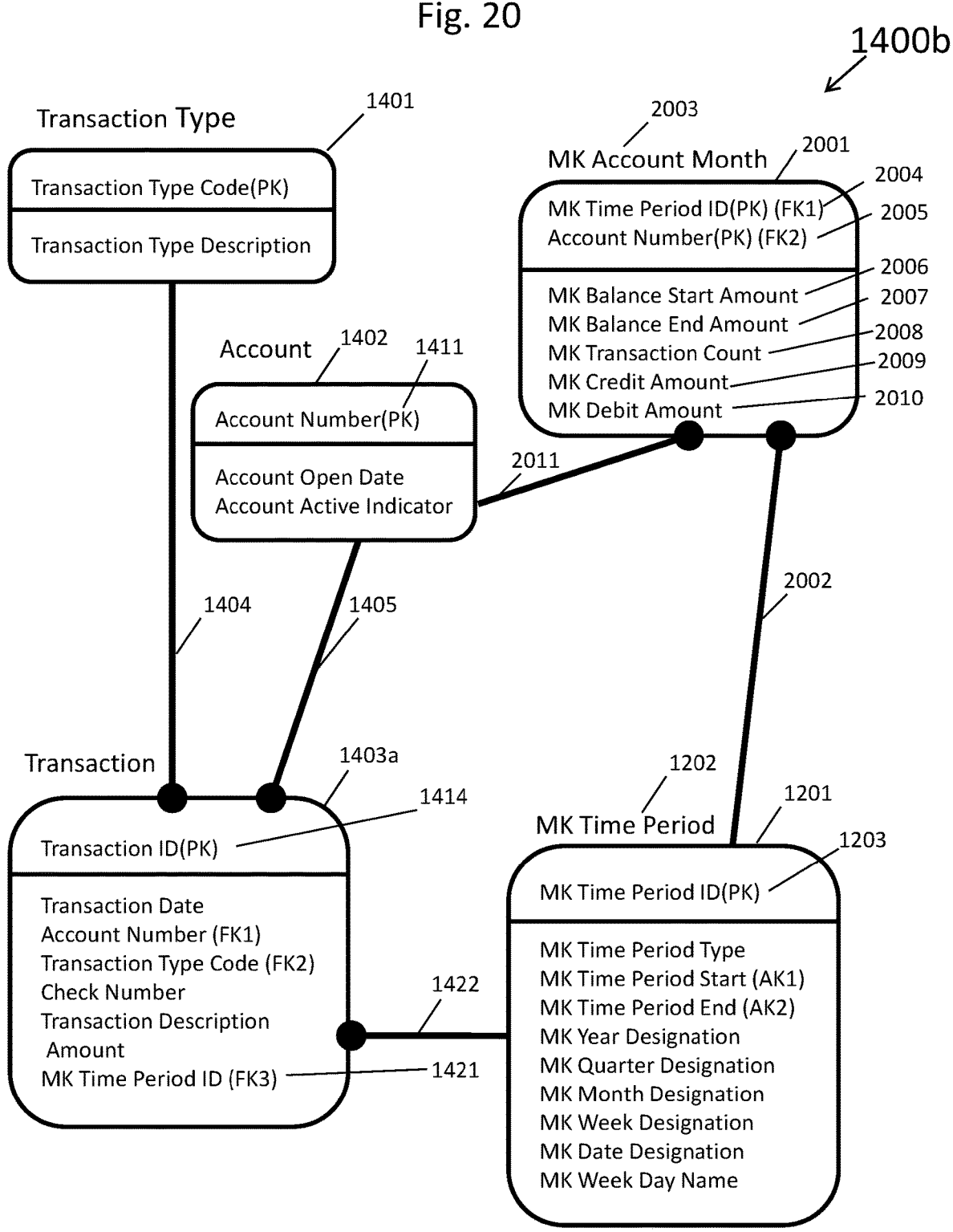
FIG. 20 depicts an entity-relationship diagram where a single homogeneous summary data entity has been added to the entity-relationship diagram shown in FIG. 14B.

FIG. 20 shows ERD 1400b, which is the result of the computer processor 4 adding summary data entity 2001 and data entity relationships 2002 and 2011 to ERD 1400a that is shown in FIG. 14B. This modification of ERD 1400a to form ERD 1400b is achieved by computer processor 4 as programmed by computer software to perform activity 917 of detailed flow chart 1900 as depicted in FIG. 19. In ERD 1400b, data entities 1401, 1402 and 1403 as well as data entity relationships 1404 and 1405 represent a target data model to be converted into a standardized homogeneous data model and are the same data entities and data entity relationships as appear in ERD 1400 shown in FIG. 14A. Unified boundary data entity 1201 and data entity relationship 1422 were added previously as part of the conversion of the target ERD to the standardized homogeneous ERD depicted in ERD 1400a shown in FIG. 14B. Data entities 1201, 1401, 1402 and 1403a and data entity relationships 1404, 1405 and 1422 that appear in both FIGS. 14B and 20 are the same data entities and data entity relationships.

Summary data entity 2001, depicted in ERD 1400b shown in FIG. 20, has data entity name 2003, named "MK Account Month". Summary data entity name 2003 is determined by the computer processor 4 as programmed by computer software in computer memory 8, from the unified metadata dictionary computer data storage area 923 using task 1901 and data flow 1916 shown in detailed flow chart 1900 shown in FIG. 19. Summary data entity 2001 contains a composite primary key composed of data attribute 2004 named "MK Time Period ID" and data attribute 2005 named "Account Number". Please note that primary key data attribute 2004 is also a foreign key data attribute denoted (FK1) in summary data entity 2001 and is the inheritance result of data entity relationship 2002 shown in entity-relationship 1400b. Foreign key data attribute 2004 is inherited from data attribute 1203 of unified boundary data entity 1201. Also, the inherited foreign key data attribute 2004 inherits the metadata for data attribute 1203 including the data attribute name. Also, please note that primary key data attribute 2005 is also a foreign key data attribute denoted (FK2) in summary data entity 2001 and is the inheritance result of data entity relationship 2011 shown in ERD 1400*b*. Foreign key data attribute 2005 is inherited from data attribute 1411 of data entity 1402. Also, the inherited foreign key data attribute 2005 inherits the metadata for data attribute 1411 including the data attribute name. Data attribute 1411 of data entity 1402 represents reference data that has not been incorporated into a unified boundary data entity at this time, but could be addressed later if needed.

Data attributes 2006, 2007, 2008, 2009 and 2010 shown in summary data entity 2001 of ERD 1400*b*, were added by the computer processor 4 as programmed by computer software stored in computer memory 8 using tasks 1903 and 1908 along with computer data storage areas 923 and 920 depicted in detailed flow chart 1900 shown in FIG. 19. The metadata of each data attribute added to summary data entity 2001 is stored for reuse in the unified metadata dictionary contained in computer data storage area 923 shown in detailed flow chart 1900 shown in FIG. 19. The use of the unified metadata dictionary insures that summary data entity contains reusable metadata and may therefore be included in the homogeneous layer of the data model along with the unified boundary data entities.

The summary data entities, such as summary data entity 2001 of ERD 1400*b*, along with the unified boundary data entities, such as unified boundary data entity 1201 of ERD 1400*b*, define a standardized homogeneous database layer. In order to develop a standardized homogeneous database layer, a unified metadata dictionary needs to be defined and maintained, such as the unified metadata dictionary stored in computer data storage area 923 of the computer memory 8, as shown in detailed flow chart 1900 shown in FIG. 19. In at least one embodiment, this unified metadata dictionary needs to be available to everyone that wants to participate in designing standardized homogeneous databases.

It is very important to note that the standardized homogeneous database layer may be considered to be a data warehouse type database that is used to augment an existing transactional database. Summary data entities, such as summary data entity 2001 of ERD 1400*b* shown in FIG. 20, are basically fact type data entities and the unified boundary data entities, such as unified boundary data entity 1201 of ERD 1400*b*, are dimension-type data entities. The combination of fact-type data entities and of dimension-type data entities form a data warehouse type ERD.

ERD 1400*b* indicates that summary data entity 2001 may be joined to both unified boundary data entity 1201 and/or data entity 1402. Summary table 2001 may now be used as a data warehouse type application where the summary data values such as those represented by data attribute 2008, 2009 and 2010 stored at the month level a data granularity, may be aggregated to quarterly and yearly results using unified boundary data entity 1201.

ERD 1400*b* indicates that summary data entity 2001 data records may be joined to data entity 1403*a* that represent transaction level data records via unified boundary data entity 1201 and/or via data entity 1402. The resultant joined data records could result in, for example, the detailed list of transaction data records that contribute to a specific summary data record as a function of time periods, from unified boundary data entity 1201, or as a function of account numbers, from data entity 1402, or as a function of both time periods and account numbers.

Figure 21:
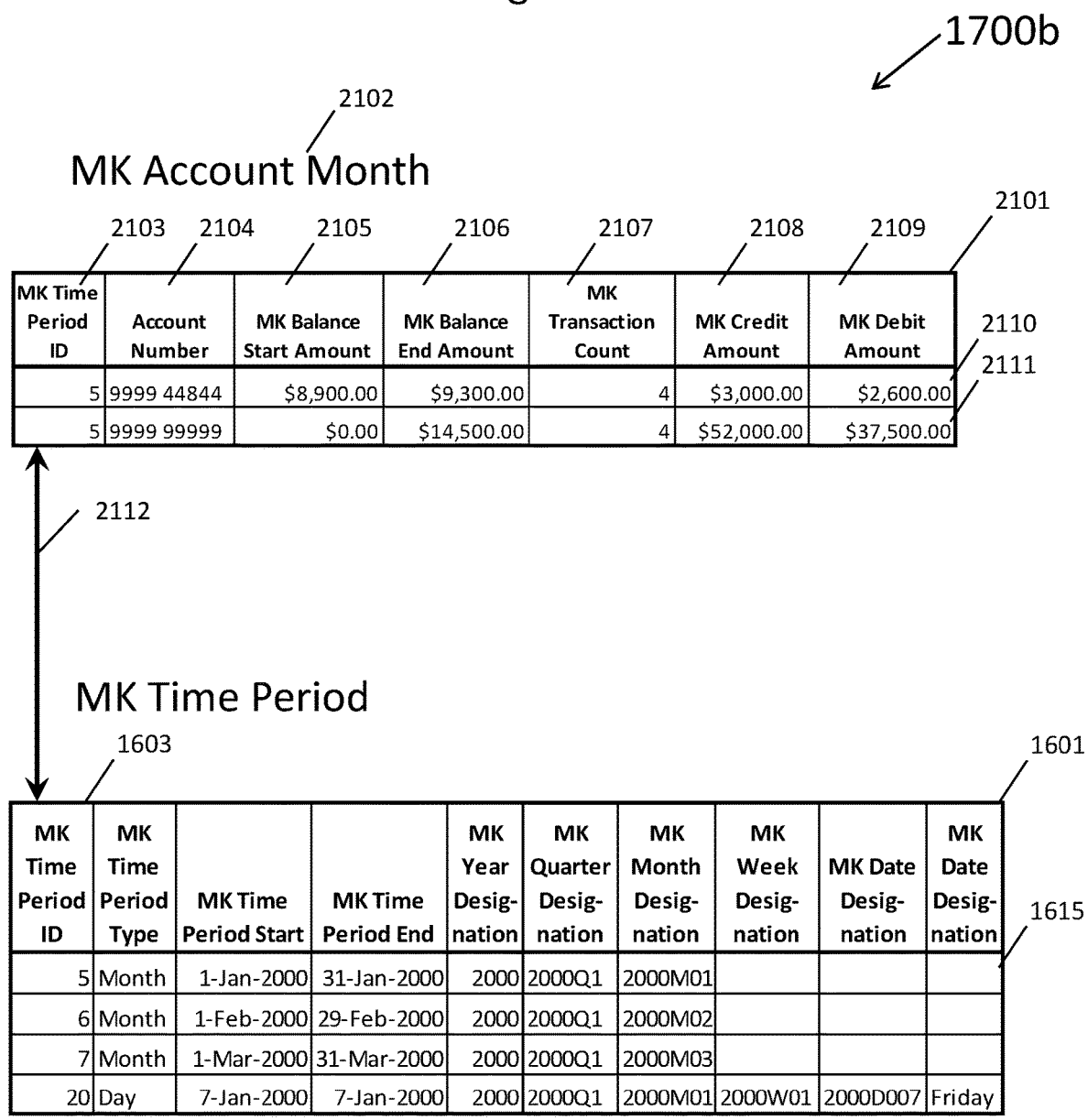
FIG. 21 depicts the populated homogeneous summary database table and the populated unified boundary database table along with the foreign key constraint that relates the two database tables, which were all instantiated from the data model containing the entity-relationship diagram shown in FIG. 20.

FIG. 21 depicts database 1700*b* which focuses upon the addition of summary database table 2101 and it's relation to unified boundary database table 1601 via foreign key constraint 2112. Please note that database 1700*b*, shown in FIG. 21, and database 1700*a*, shown in FIG. 17B; both represent a part of the same database where database table 1601 is common to both representations. Database 1700*a*, results from the computer processor 4 implementing activity 915, while database 1700*b*, results from the computer processor 4 implementing activity 917, where both activities are depicted in master flow chart 900 shown in FIG. 9.

Summary database table 2101, unified boundary database table 1601, and foreign key constraint 2112 of database 1700*b*, which is shown in FIG. 21, were instantiated from summary data entity 2001, unified boundary data entity 1201, and data entity relationship 2002 respectively of ERD 1400*b* shown in FIG. 20. The database instantiation of the summary database table and the foreign key constraints is directed by task 1911 of detailed flow chart 1900 shown in FIG. 19. Summary database table name 2102 of database 1700*b*, named "MK Account Month", is the result of database instantiating summary data entity name 2003, named "MK Account Month" which is shown in FIG. 20. Database columns 2103, 2104, 2105, 2106, 2107, 2108 and 2109 of summary database table 2101, shown in FIG. 21, result from the database instantiation of data attributes 2004, 2005, 2006, 2007, 2008, 2009 and 2010 respectively of summary data entity 2001 depicted in data model 1400*b* as shown in FIG. 20.

The computer processor 4 is programmed by computer software stored in computer memory 8 to use the foreign key constraint 2112 to constrain the data values of database column 2103 of database table 2101 based upon the data values in database columns 1603 of database table 1601. Foreign key constraint 2112 is used by the computer processor 4 to maintain the database referential integrity between database table 2101 and database table 1601 and to support the bidirectional database access path between these two database tables.

Summary database table 2101 is populated, by the computer processor 4, with data records such as data records 2110 and 2111 that result from the aggregation of the data records in database table 1701*a* that is shown in FIG. 17B. This population of the summary table would normally be accomplished using prior art methods and the combination of the data available in database table 1701*a* and the data available in unified boundary database table 1601 shown in FIG. 17B. The population of the summary database tables, such as summary database table 2101, is achieved by task 1913, as implemented by the computer processor 4 as shown in detailed flow chart 1900 in FIG. 19.

Summary database tables, such as database table 2101, along with the unified boundary database tables, such as unified boundary database table 1601, form the standardized homogeneous layer of any database. The use of the unified metadata dictionary is very important, in at least one embodiment, for providing reusable metadata for multiple databases. Again, metadata is always used to access data records in database tables. Without the reusable metadata across databases, the ability to integrate summary data across databases would be very limited.

Figure 22A:
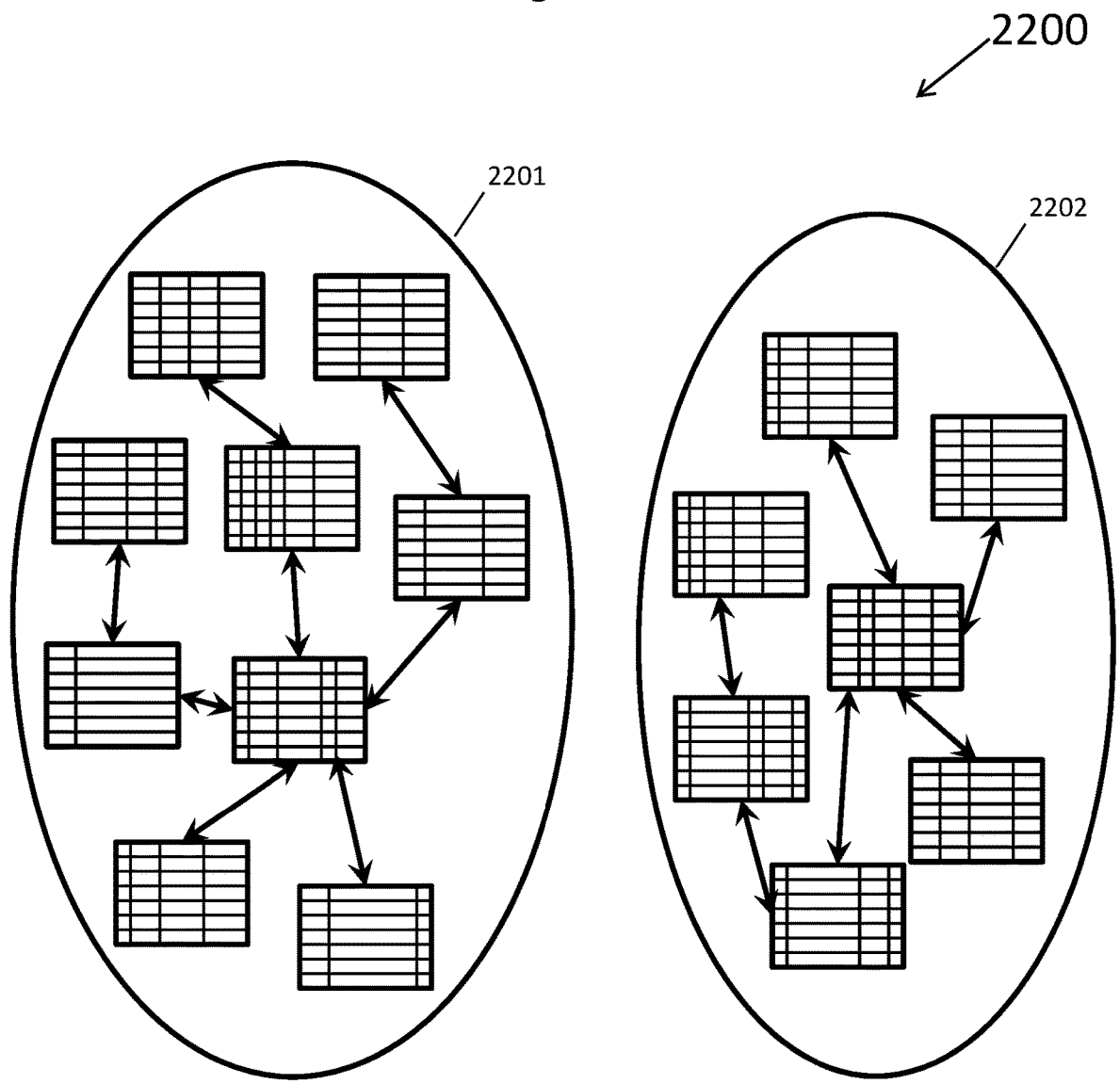
FIG. 22A depicts two prior art independent heterogeneous databases in a single computing environment such as the computing environment shown in FIG. 1.

FIG. 22A shows computer environment 2200 that contains independent heterogeneous database 2201 and contains independent heterogeneous database 2202. These two prior art databases may exist on the same computer, or may exist on two different computers that may be connected by a computer network. In any event, these two databases are isolated from each other in that they contain no deliberate metadata commonality and no deliberate data set commonality. Attempting to join data records from database 2201 with data records from database 2202 would be difficult simply because nether database 2210 nor database 2202 were designed to support the joining of data records beyond their own database boundary. That is, database referential integrity is not supported beyond each database boundary and database access paths are not provided beyond each database boundary. Neither database contains a standardized homogeneous database layer. Neither of these databases contains a data warehouse that is integrated with the databases heterogeneous transactional data set. Each of these databases supports a unique local boundary of database tables and a unique independent network of database access paths. Prior art databases are very much isolated from each other because of prior art database design methods that do not address the sharing of data sets beyond the database boundary.

Figure 22B:
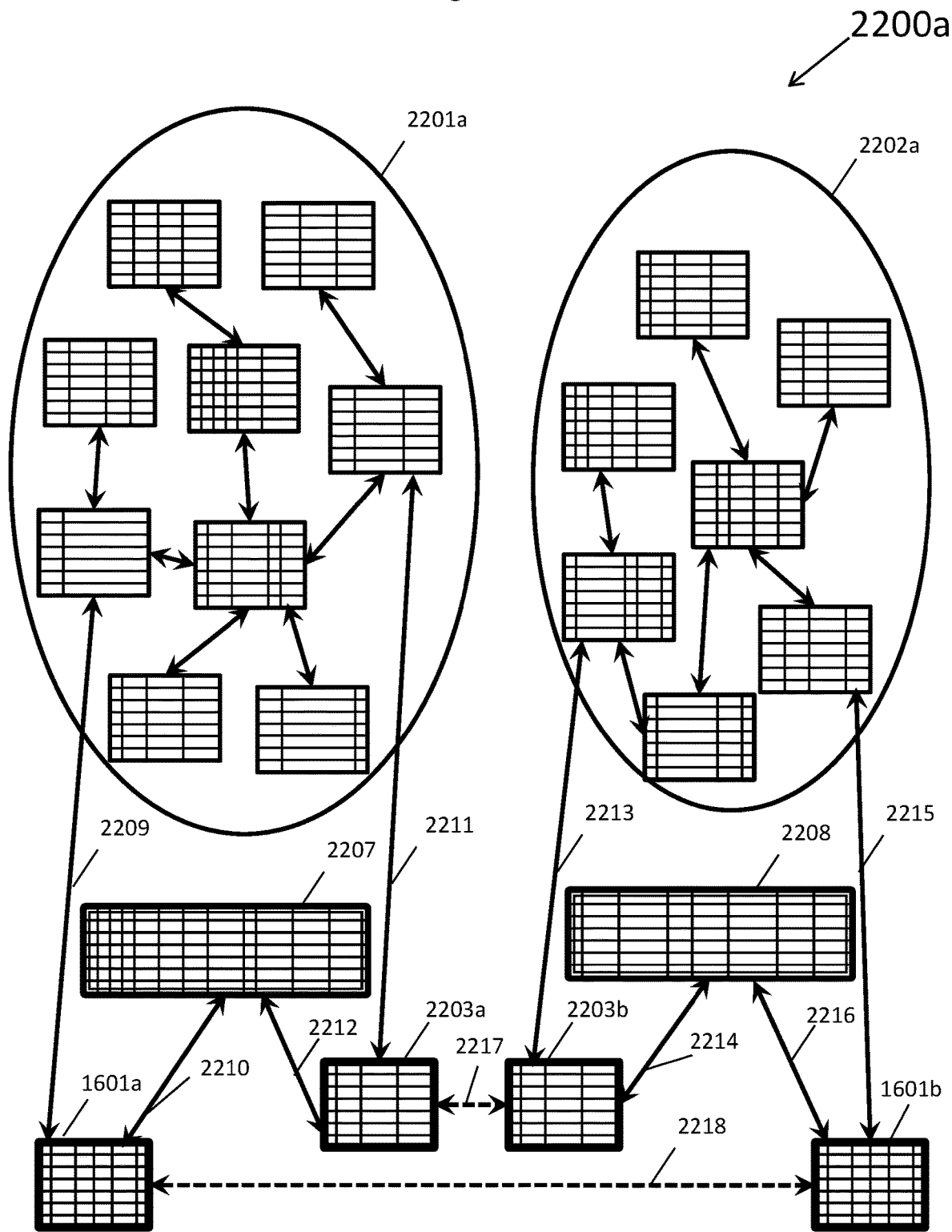
FIG. 22B depicts the two databases in a single computing environment from FIG. 22A after both databases were each converted into a standardized homogeneous database, in accordance with an embodiment of the present invention.

FIG. 22B shows computer environment 2200a which contains databases 2201a and 2202a. Independent heterogeneous databases 2201 and 2202, both shown in FIG. 22A, have both been converted, by the computer processor 4 as programmed by computer software, to standardized homogeneous databases 2201a and 2202a respectively, both of which are now shown in FIG. 22B. These two standardized homogeneous databases may be on the same computer, or may exist on two different computers that may be connected by a computer network. Unified boundary database tables 2203a and 1601a, summary database table 2207, and foreign key constraints 2209, 2210, 2211 and 2212 have been added to database 2201, shown in FIG. 22A, by the computer processor 4 as programmed by computer software stored in computer memory 8, to form standardized homogeneous database 2201a. Unified boundary database tables 2203b and 1601b, summary database table 2208, and foreign key constraints 2213, 2214, 2215 and 2216 have been added to database 2202, shown in FIG. 22A, by computer processor 4 as programmed by computer software stored in computer memory 8, to form standardized homogeneous database 2202a. Unified boundary database tables 2203a and 2203b are structurally exact copies and are populated in computer memory 8 by the computer processor 4 using the same standardized process. Unified boundary database tables 1601a and 1601b are structurally exact copies and are populated in computer memory 8 by the computer processor 4 using the same standardized process. The structure of these two summary database tables 2207 and 2208 is not necessarily the same but both summary database tables are based upon the unified metadata dictionary, such as unified metadata dictionary 923 of detailed flow chart 1900 shown in FIG. 19. Computer environment 2200a, which is shown in FIG. 22B, also depicts database bridges 2217 and 2218. Each database bridge provides a bidirectional inter-database access path that allows for the combination of a data set from one standardized homogeneous database, such as database 2201a, with a data set the other standardized homogeneous database, such as database 2202a.

All prior art databases, such as database 2201 shown in FIG. 22A, have a local database boundary beyond which database access paths that are maintained by foreign key constraints do not exist. The use of unified boundary database tables, for standardized homogeneous databases 2201a and 2202a, provides a unified boundary of database tables to both databases. This standardized boundary of database tables provides both metadata commonality and data set commonality to each database.

Upon conversion of a prior art database, such as database 2201 shown in FIG. 22A, into a standardized homogeneous database, such as database 2201a shown in FIG. 22B, the database referential integrity and the bidirectional database access paths will be extended beyond the original local database boundary of the database. The database management system for database 2201a will provide database referential integrity support for unified boundary database tables with foreign key constraints 2209, 2210, 2211 and 2212. The database management system for database 2202a will provide database referential integrity support with foreign key constraints 2213, 2214, 2215 and 2216.

Referential integrity of database bridges, such as database bridge 2218 shown in computer environment 2200a, is not currently enforced by the database management system software applications. Instead, the database bridge referential integrity must be maintained by the procedures used to define and used to populate the unified boundary database tables with standardized homogeneous data records. Unified boundary database tables 1601a and 1601b of computer environment 2200a are both database instantiated from a single unified boundary data entity, such as unified boundary data entity 1201 of ERD 1200 shown in FIG. 12. In addition, instantiated unified boundary database tables 1601a and 1601b are both populated by computer processor 4 with unified homogeneous data records using the same standardized procedure. Now, both populated unified boundary database tables 1601a and 1601b are the same as populated unified boundary database table 1601 shown in database 1600 shown in FIG. 16. Since both unified database tables 1601a and 1601b are populated with the same data records, combining standardized homogeneous data records from both of these unified boundary database tables would be very simple. For example, the unique business key data values of database table 1601a for a specific standardized homogeneous data record will always equal the unique business key data values of the same standardized homogeneous data record of database table 1601b. Now, the data set of database 2201a may now be combined with the data set of database 2202a via database bridges, such as database bridge 2217.

Any combination of transactional data and summary data may be combined from database 2201a and 2202a. If unified boundary database tables are utilized that support multiple levels of data granularity, data records may now be aggregated or allocated to support roll-up and drill-down data warehouse functionality for any data records contained within either database. Therefore, two different data records that exist at different levels of data granularity may now be restated to a compatible level of data granularity before these data records are combined. The ability to restated data records at a variety of data granularity adds flexibility to both databases that neither database had before the addition of unified boundary database tables.

Both databases 2201a and 2202a contain a standardized homogeneous metadata layer comprised from unified boundary database tables 1601a and 2203a and summary database table 2207 in database 2201a and comprised from unified boundary database tables 1601b and 2203b and summary database table 2208 in database 2202a. The standardized homogeneous metadata layer, based upon the unified metadata dictionary, provides reusability across multiple databases. When a specific data element is required, the unified metadata dictionary may be used to locate that specific data element.

Database 2201 and database 2202 of computer environment 2200 shown in FIG. 22A were designed to be isolated from each other. Each database was designed with a unique local boundary of database tables and a unique network of database access paths. However, database 2201*a* and database 2202*a* of computer environment 2200*a* shown in FIG. 22B were designed to be integrated with each other. Now, each database has a common database boundary and a connected network of database access paths.

The computer environment 2200*a* shown in FIG. 22B was for only two standardized homogeneous databases, however, any database that is a standardized homogenous database may participate with any other standardized homogeneous database to provide integrated data sets.

I claim:

1. A method to form a first database bridge providing a bidirectional inter-database access path between a first database and a second database comprising
   forming the first database in a computer memory; wherein the first database includes a first plurality of database tables;
   forming the second database in a computer memory, wherein the second database includes a second plurality of database tables;
   adding a first database table with a first unique index to the first database, wherein the first unique index is unique to the first database table, so that each data record of a plurality of data records of the first database table has a different data value of the first unique index from every other data record of the plurality of data records of the first database table, and storing the first database table added to the first database in a computer memory; and
   adding a second database table, to the second database, wherein the second database table includes the first unique index, wherein the first unique index is unique to the second database table, so that each data record of a plurality of data records of the second database table has a different data value of the first unique index from every other data record of the plurality of data records of the second database table, and storing the second database table added to the second database in a computer memory;
   populating the first database table in the first database from a first set of data records;
   populating the second database table in the second database from the first set of data records; and
   combining data records from the first database and data records from the second database using the bidirectional inter-database access path.

2. The method of claim 1 wherein
   the first database table added to the first database does not inherit a foreign key constraint from any of the first plurality of database tables; and
   the second database table added to the second database does not inherit a foreign key constraint from any of the second plurality of database tables.

3. The method of claim 1 wherein
   the first unique index is comprised of at least one fundamental business key database column.

4. The method of claim 1 wherein
   the first database is managed by a first database management system; and
   the second database is managed by a second database management system.

5. The method of claim 1 wherein
   wherein the first database table of the first database and the second database table of the second database are structurally exact copies defining metadata commonality for the first database bridge.

6. The method of claim 1 further comprising
   adding a second unique index to the first database table in the first database;
   adding the second unique index to the second database table in the second database;
   wherein adding the second unique index to both the first and second database tables forms a second database bridge between the first and second database tables when the first database table and the second database table are populated with data records from the first set of data records.

7. An apparatus comprising,
   a computer processor; and
   a non-transitory computer readable medium having a first database stored therein and having instructions stored therein for programming the computer processor to form the first database table with multiple discrete levels of data record granularity in the non-transitory computer readable medium by:
   instantiating a first database table in the first database in the non-transitory computer readable medium;
   wherein the first database table is comprised of a first plurality of database table columns;
   instantiating a first database table column in the first database table;
   declaring a first data value defining a first discrete level of data record granularity and designating a first type of data record;
   wherein the first type of data record stores data values in a first set of database table columns from the first plurality of database table columns;
   declaring a second data value defining a second discrete level of data record granularity and designating a second type of data record;
   wherein the second type of data record stores data values in a second set of database table columns from the first plurality of database table columns;
   wherein the first set of database table columns is different than the second set of database table columns;
   wherein the first data value is stored in the first database table column of the first database table for the first type of data record of the first discrete level of data record granularity;
   wherein the second data value is stored in the first database table column of the first database table for the second type of data record of the second discrete level of data record granularity; and
   wherein the first discrete level of data record granularity is different from the second discrete level of data record granularity;
   wherein the non-transitory computer readable medium having instructions stored therein also has instructions for programming the computer processor to define a first database bridge by;
   instantiating a first unique index in the first database table in the first database and instantiating a copy of the first unique index in a copy of the first database table in a second database;
   wherein the instructions stored in the non-transitory computer readable medium include instructions to populate the first database table in the first database with a first plurality of data records and the copy of the first database table in the second database with the first plurality of data records;
   wherein the first plurality of data records contains both the first type of data record and the second type of data record;

wherein the first plurality of data records is stored in the non-transitory computer readable medium; and wherein the first database bridge is a bidirectional inter-database access path that joins the first unique index of the first database table in the first database with the copy of the first unique index in the copy of the first database table in the second database.

8. The apparatus of claim 7 wherein the instructions stored in the one or more computer memories include a first plurality of instructions defining a first database management system to manage the first database;

wherein the instructions stored in the one or more computer memories include a second plurality of instructions defining a second database management system to manage the second database.

9. The apparatus of claim 7 wherein the first unique index in the first database table is comprised of at least one fundamental business key database table column.

10. The apparatus of claim 7 wherein the first database includes a first plurality of database tables; and wherein the instructions to populate the first database table are instructions to derive the first plurality of data records from the plurality of database tables in the first database.

11. The apparatus of claim 10 wherein the first database table does not inherit a foreign key constraint from any of the first plurality of database tables.

12. The apparatus of claim 7 wherein the non-transitory computer readable medium has stored therein instructions for programming the computer processor to instantiate a second unique index in the first database table defining a second database bridge.

13. An apparatus comprising, a computer processor; and one or more computer memories having stored therein a first database comprised of a first plurality of database tables and a second database comprised of a second plurality of database tables and a first database bridge defining a first bidirectional inter-database access path between the first database and the second database; and wherein the one or more computer memories further has stored therein instructions for programming the computer processor to retrieve data records from the first database and the second database in the one or more computer memories by:

combining data records retrieved from the first plurality of database tables and data records retrieved from the second plurality of database tables using the first database bridge; and wherein the first database bridge is formed between a first unique index instantiated in a first database table in the first database and a copy of the first unique index instantiated in a second database table in the second database;

wherein the first database table of the first database and the second database table of the second database are both populated with data records from a first set of data records defining data set commonality for both the first database table and the second database table;

wherein the first unique index is unique to the first database table of the first database, so that each data record of a plurality of data records of the first database table has a different data value of the first unique index from every other data record of the plurality of data records of the first database table; and wherein the copy of the first unique index is unique to the second database table of the second database, so that each data record of a plurality of data records of the second database table has a different data value of the copy of the first unique index from every other data record of the plurality of data records of the second database table.

14. The apparatus of claim 13 wherein the first database table of the first database does not inherit a foreign key constraint from any of the first plurality of database tables; and the second database table of the second database does not inherit a foreign key constraint from any of the second plurality of database tables.

15. The apparatus of claim 13 wherein the first database table of the first database and the second database table of the second database are structurally exact copies defining structural metadata commonality for the first database bridge.

16. The apparatus of claim 13 wherein the first unique index of the first database table and of the second database table is comprised of at least one fundamental business key database column.

17. The apparatus of claim 13 wherein the instructions stored in the one or more computer memories include a first plurality of instructions defining a first database management system to manage the first database;

wherein the instructions stored in the one or more computer memories include a second plurality of instructions defining a second database management system to manage the second database.

18. The apparatus of claim 13 wherein the instructions stored in the one or more computer memories include instructions for programming the computer processor to:

instantiate a third database table with a second unique index in the first database;

instantiate a fourth database table with a second unique index in the second database;

wherein a second database bridge is formed between the second unique index in the third database table in the first database and the second unique index in the fourth database table in the second database; and wherein the third database table of the first database and the fourth database table of the second database are both populated with data records from a second set of data records defining data set commonality for the second database bridge.

19. The apparatus of claim 18 wherein the instructions stored in the one or more computer memories include instructions for programming the computer processor to:

combine data records retrieved from the first database and data records retrieved from the second database using the second database bridge.

20. The apparatus of claim 18 wherein the instructions stored in the one or more computer memories include instructions for programming the computer processor to:

combine data records retrieved from the first database and data records retrieved from the second database using the first database bridge and the second database bridge.

21. The method of claim 1 wherein
the first database table is added as part of a first standardized homogeneous metadata layer; and
the second database table is added as part of a second standardized homogeneous metadata layer.

22. The method of claim 21 wherein
the first standardized homogeneous metadata layer includes a first summary database table linked to the first database table;
wherein the first summary database table is based on a unified metadata dictionary;
wherein the first summary database table is populated with data values from the first plurality of database tables of the first database;
wherein the second standardized homogeneous metadata layer includes a second summary database table linked to the second database table; and
wherein the second summary database table is based on the unified metadata dictionary and is structurally different from the first summary database table; and
wherein the second summary database table is populated with data values from the second plurality of database tables of the second database.

23. The method of claim 21 wherein
the first standardized homogeneous metadata layer is added to the first database without determining and without using a difference between the between the first database and the second database as the first database and the second database exist prior to adding the first standardized homogeneous metadata layer to the first database; and
the second standardized homogeneous metadata layer is added to the second database without determining and without using a difference between the between the first database and the second database as the first database and the second database exist prior to adding the second standardized homogeneous metadata layer to the second database.

24. The apparatus of claim 13 wherein
the first database table of the first database bridge is not formed by determining and using a difference between the first database and the second database as the first database and the second database exist prior to the first database table being part of the first database; and
wherein the second database table of the first database bridge is not formed by determining and using a difference between the first database and the second database as the first database and the second database exist prior to the second database table being part of the second database.

* * * * *